(12) United States Patent
Dasgupta et al.

(10) Patent No.: US 10,757,121 B2
(45) Date of Patent: Aug. 25, 2020

(54) DISTRIBUTED ANOMALY DETECTION MANAGEMENT

(71) Applicant: Cisco Technology, Inc., San Jose, CA (US)

(72) Inventors: Sukrit Dasgupta, Norwood, MA (US); Jean-Philippe Vasseur, Anchorage, AK (US); Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 32 days.

(21) Appl. No.: 15/212,588

(22) Filed: Jul. 18, 2016

(65) Prior Publication Data

US 2017/0279838 A1 Sep. 28, 2017

Related U.S. Application Data

(60) Provisional application No. 62/313,465, filed on Mar. 25, 2016.

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01); *H04L 63/145* (2013.01)

(58) Field of Classification Search
CPC ............................ H04L 63/1425; G06N 99/005
USPC .................................................... 726/22–25
See application file for complete search history.

(56) References Cited

U.S. PATENT DOCUMENTS

| | | | |
|---|---|---|---|
| 6,831,912 B1 | 12/2004 | Sherman | |
| 7,227,872 B1 | 6/2007 | Biswas et al. | |
| 7,483,433 B2 | 1/2009 | Simmons et al. | |
| 7,653,075 B2 | 1/2010 | Singh et al. | |
| 7,991,864 B2 | 8/2011 | Patel et al. | |
| 8,032,641 B2 | 10/2011 | Li et al. | |
| 8,504,504 B2 | 8/2013 | Liu | |
| 2006/0075503 A1* | 4/2006 | Bunker | G06F 11/324 726/25 |
| 2007/0101428 A1* | 5/2007 | Hamada | H04L 63/1458 726/23 |

(Continued)

OTHER PUBLICATIONS

Chang et al., "LEISURE: Load-Balanced Network-Wide Traffic Measurement and Monitor Placement," IEEE Transactions on Parallel and Distributed Systems Year: 2015 | vol. 26, Issue: 4 | Journal Article.*

(Continued)

*Primary Examiner* — Roderick Tolentino
(74) *Attorney, Agent, or Firm* — Behmke Innovation Group LLC; Kenneth J. Heywood; Jonathon P. Western

(57) ABSTRACT

In one embodiment, a device in a network performs anomaly detection functions using a machine learning-based anomaly detector to detect anomalous traffic in the network. The device identifies an ability of one or more nodes in the network to perform at least one of the anomaly detection functions. The device selects a particular one of the anomaly detection functions to offload to a particular one of the nodes, based on the ability of the particular node to perform the particular anomaly detection function. The device instructs the particular node to perform the selected anomaly detection function.

13 Claims, 20 Drawing Sheets

(56) References Cited

U.S. PATENT DOCUMENTS

| | | | |
|---|---|---|---|
| 2008/0184371 A1* | 7/2008 | Moskovitch | G06F 21/566 726/24 |
| 2009/0113547 A1* | 4/2009 | Higashikado | G06F 21/552 726/23 |
| 2014/0283052 A1* | 9/2014 | Jordan | G06F 21/562 726/23 |
| 2014/0310390 A1 | 10/2014 | Sorenson, III et al. | |
| 2014/0325649 A1 | 10/2014 | Zhang | |
| 2015/0033086 A1* | 1/2015 | Sasturkar | G06F 16/26 714/57 |
| 2015/0106308 A1 | 4/2015 | Harrison et al. | |
| 2015/0193693 A1 | 7/2015 | Vasseur et al. | |
| 2015/0193694 A1 | 7/2015 | Vasseur et al. | |
| 2016/0028750 A1 | 1/2016 | Di Pietro et al. | |
| 2016/0028751 A1 | 1/2016 | Cruz Mote et al. | |
| 2016/0036837 A1* | 2/2016 | Jain | H04L 63/1416 726/23 |
| 2016/0150421 A1* | 5/2016 | Li | H04W 4/70 370/252 |
| 2016/0182623 A1* | 6/2016 | Waycott | H04L 67/1031 709/203 |
| 2016/0234091 A1* | 8/2016 | Emmadi | H04L 41/0893 |
| 2017/0126512 A1* | 5/2017 | Seed | H04L 67/30 |

OTHER PUBLICATIONS

Adamova et al., "Network anomaly detection in the cloud: The challenges of virtual service migration," 2014 IEEE International Conference on Communications (ICC) Year: 2014 | Conference Paper.*

Lancope, Inc.—Network Performance + Security Monitoring™; "Buyer's Guide Not All NetFlow™ Systems Are Created Equal" 2011; pp. 1-8.

European Search Report dated Aug. 4, 2017 in conneciton with European Application No. 17 16 2418.

* cited by examiner

DISTRIBUTED ANOMALY DETECTION MANAGEMENT

RELATED APPLICATION

This application claims priority to U.S. Provisional Application No. 62/313,465, filed on Mar. 25, 2016, entitled DISTRIBUTED ANOMALY DETECTION MANAGEMENT, by Dasgupta, et al., the contents of which are herein incorporated by reference.

TECHNICAL FIELD

The present disclosure relates generally to computer networks, and, more particularly, to distributed anomaly detection management.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
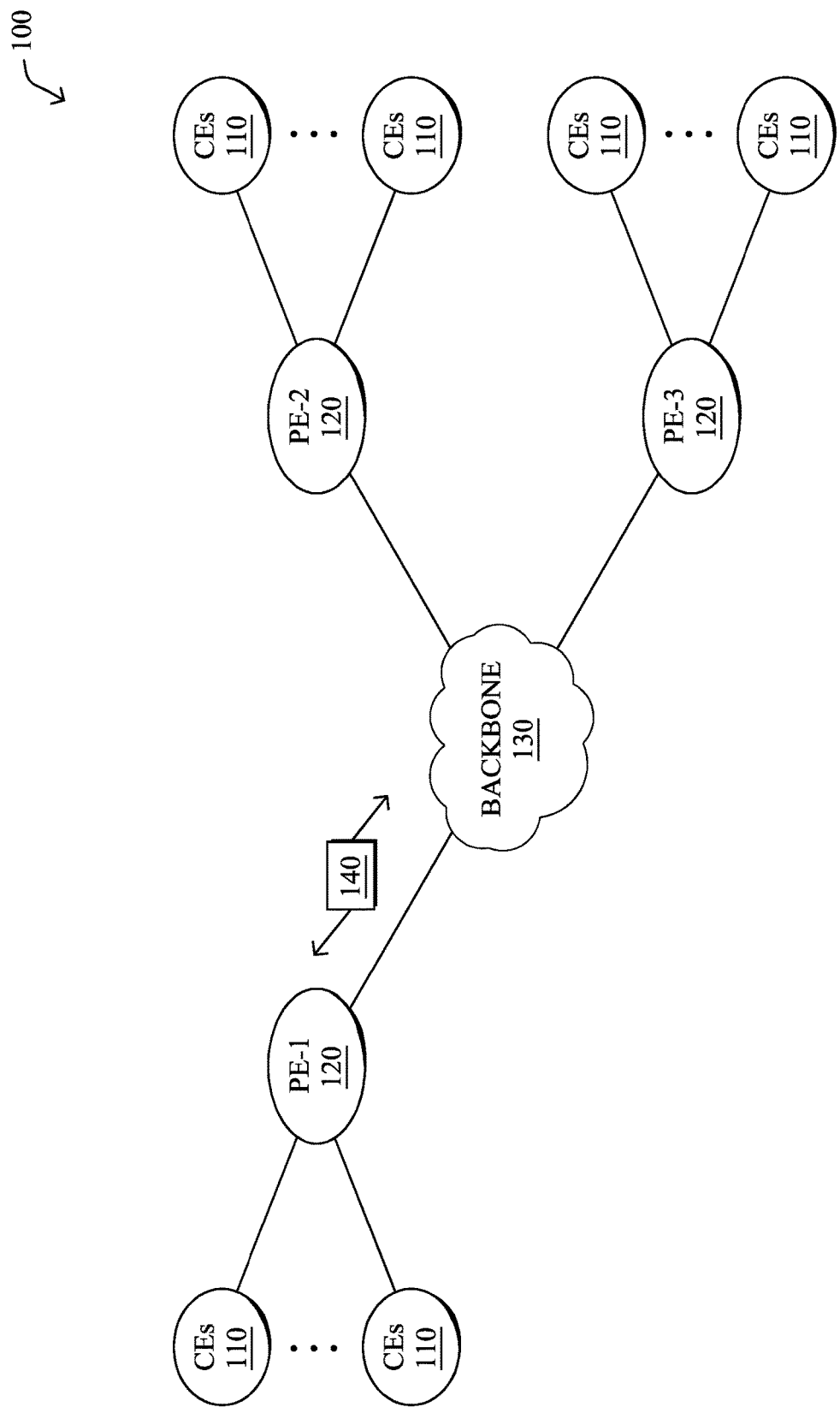
FIGS. 1A-1B illustrate an example communication network.

According to one or more embodiments of the disclosure, a device in a network performs anomaly detection functions using a machine learning-based anomaly detector to detect anomalous traffic in the network. The device identifies an ability of one or more nodes in the network to perform at least one of the anomaly detection functions. The device selects a particular one of the anomaly detection functions to offload to a particular one of the nodes, based on the ability of the particular node to perform the particular anomaly detection function. The device instructs the particular node to perform the selected anomaly detection function.

In further embodiments, a device in a network identifies a set of one or more nodes that convey intra-branch traffic in the network. The device provides the set of nodes that convey intra-branch traffic to a supervisory device. The device receives a selection from the supervisory device of one of the set of nodes that conveys intra-branch traffic. The device instructs the selected node that conveys intra-branch traffic to capture traffic data regarding at least a portion of the intra-branch traffic for assessment by a machine learning-based anomaly detector.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
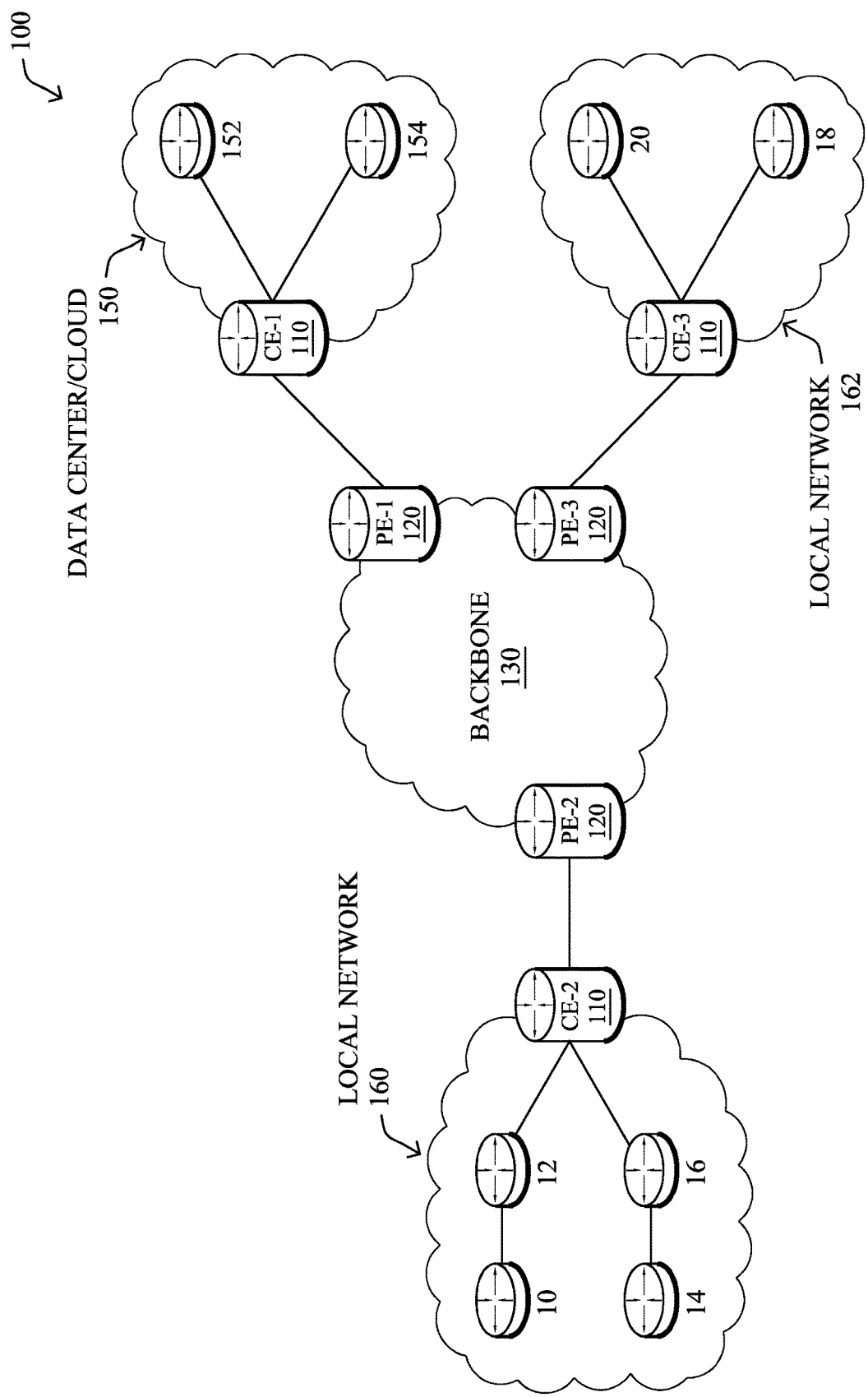

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
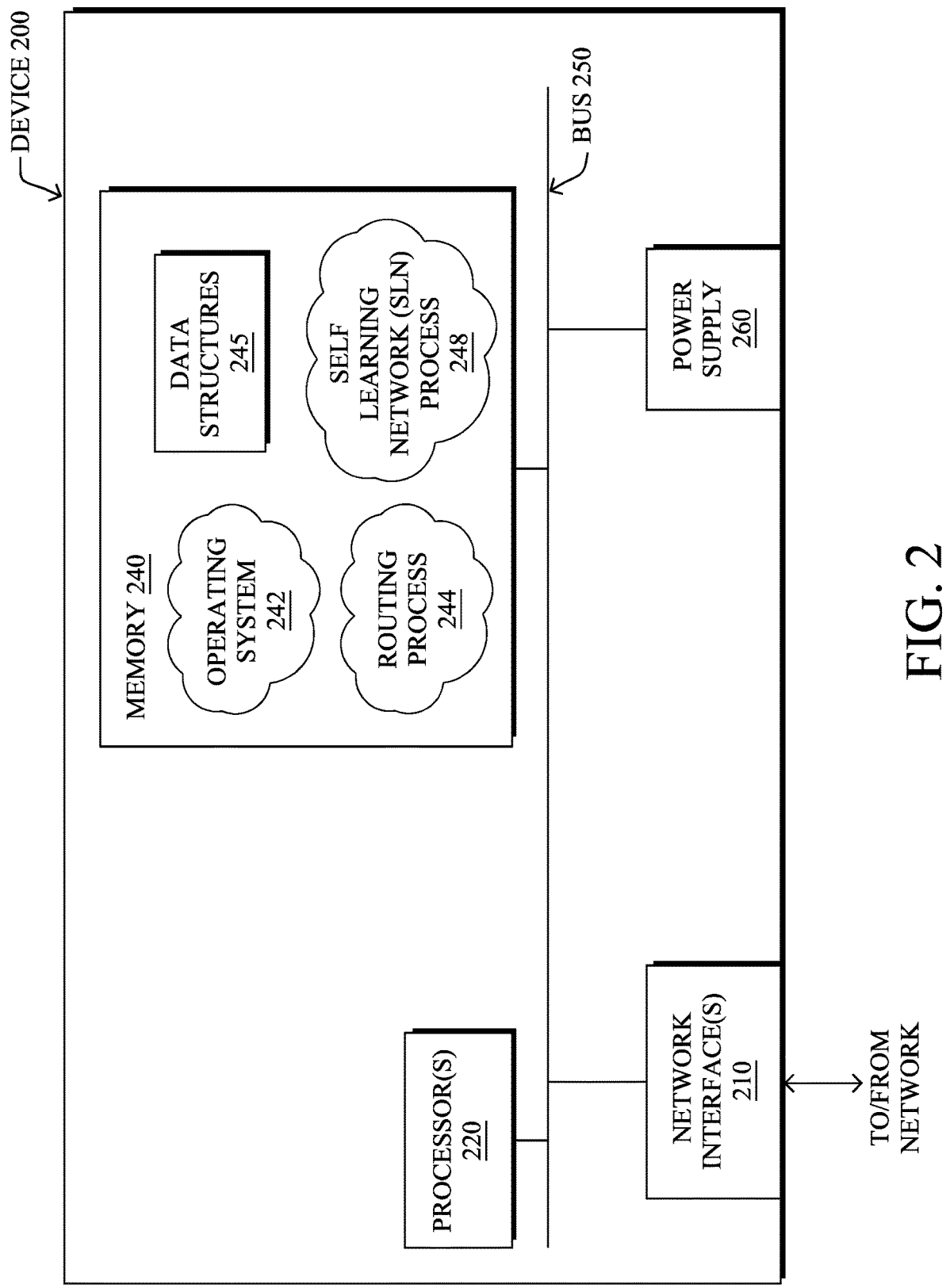
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
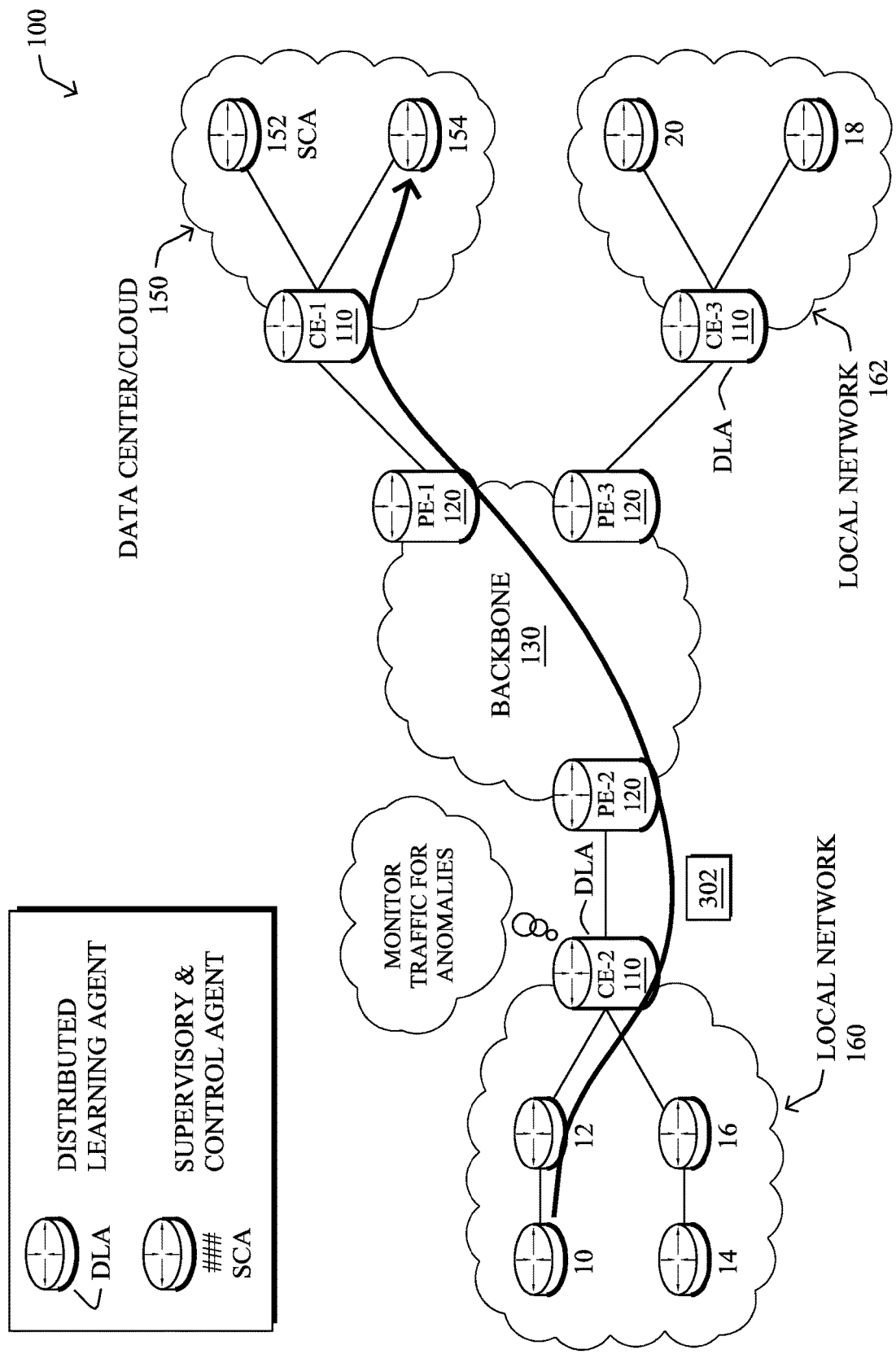
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
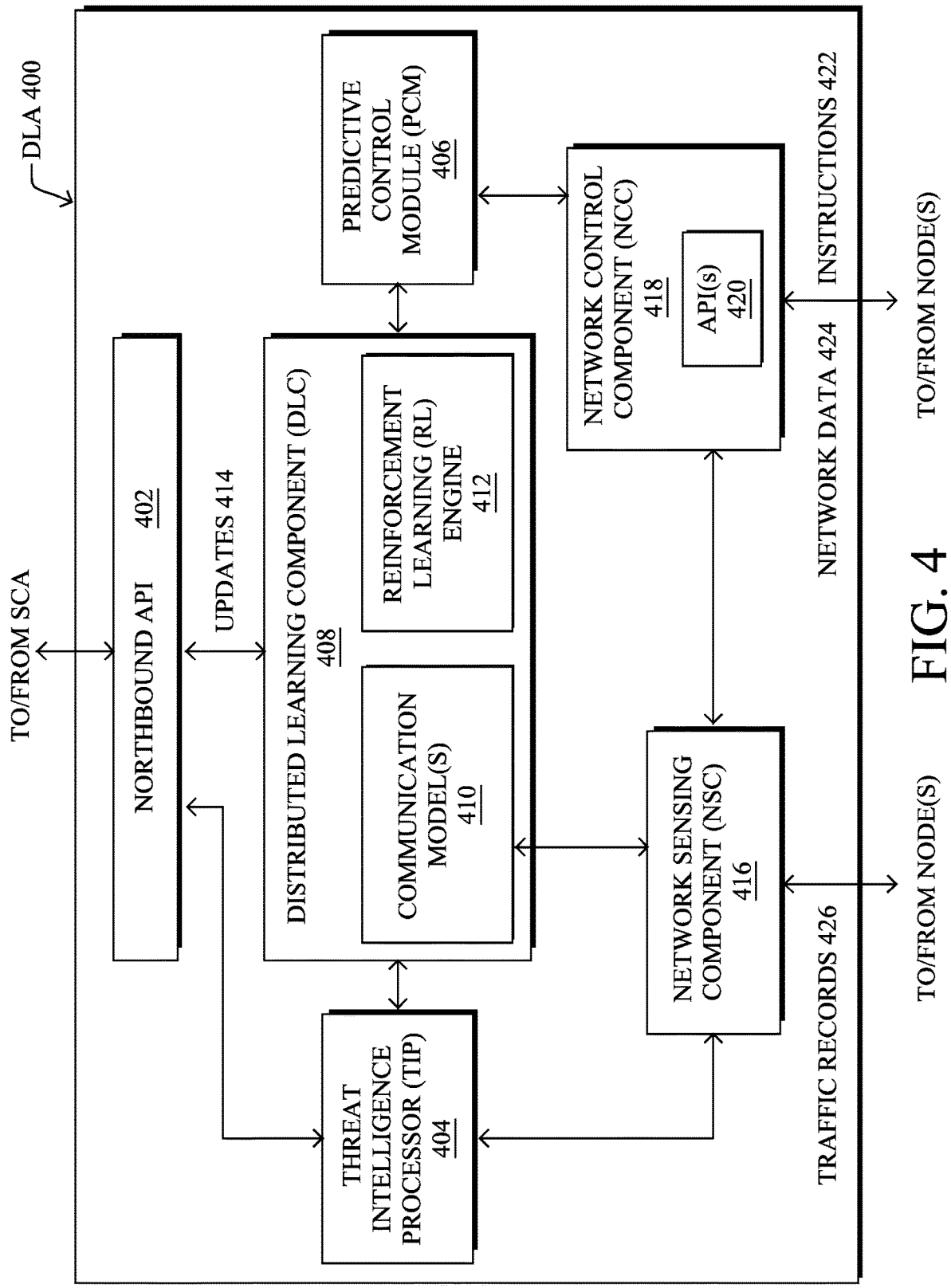
FIG. 4 illustrates an example distributed learning agent (DLA) in an SLN.

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feedback loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

Using a Network as a Platform for Dynamic Detector Computations

One of the key challenges of distributed analytics systems such as SLNs is the computation of anomaly detection models on premise to characterize the traffic using various features. Depending on the network configuration, such a computation may not always be available on premise (e.g., the sensor) but on other network elements that reside in the same subnet. Note that such off-loaded computation may be dictated by architectural (deployment) considerations. These network elements could be other switches and routers in the same network with more available computational capabilities. In various aspects, the techniques herein address two situations related to model computation for distributed learning:

1. Computing models that relate to East-West, intra-branch traffic, but only where the sensor does not have the ability to perform the computation itself (e.g., a common case with low-end CPU switches).
2. When CPU utilization crosses a predefined threshold in a network element, but continuous model computation is still required.

The techniques herein, therefore, address an important computational issue in a distributed analytics architecture by enabling a network element to offload anomaly model computations to other nodes in the network. This allows a learning agent to track large amounts of flows and large networks by using the resources already available in a network. In some aspects, custom messaging and coordination mechanisms are introduced to ensure information generated at the various network elements that have been given model computation responsibilities is analyzed correctly and shared correctly with the learning agent.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, in accordance with various embodiments herein, a device in a network performs anomaly detection functions using a machine learning-based anomaly detector to detect anomalous traffic in the network. The device identifies an ability of one or more nodes in the network to perform at least one of the anomaly detection functions. The device selects a particular one of the anomaly detection functions to offload to a particular one of the nodes, based on the ability of the particular node to perform the particular anomaly detection function. The device instructs the particular node to perform the selected anomaly detection function.

Figure 5A:
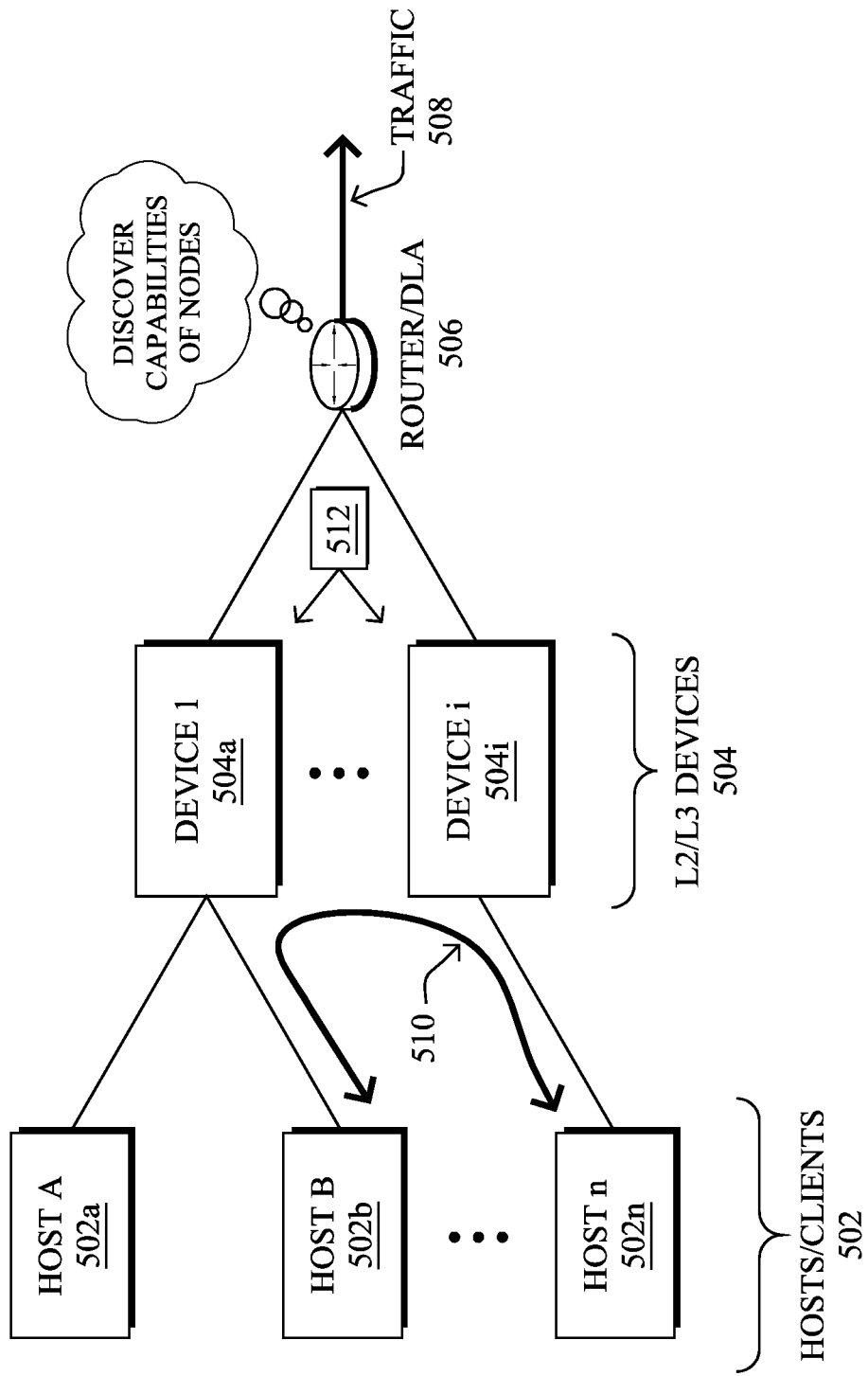
FIGS. 5A-5F illustrate examples of a DLA coordinating the computation of an anomaly detection model.

Operationally, and with reference generally to FIGS. 5A-5F, various challenges exist with respect to performing anomaly detection solely at the network edge. For example, as shown in FIG. 5A, consider a branch network that includes any number of hosts 502a-502n (e.g., a first through $n^{th}$ host) that are interconnected with a DLA/router 506 via any number of intermediate networking devices 504 (e.g., a first through $i^{th}$ device). Devices 504 may be, for example, Layer-2 (L2) devices (e.g., switches) and/or Layer-3 (L3) devices, such as routers.

In a simple case, DLA 506 may observe traffic 508 flowing through DLA 506, to assess whether traffic 508 is anomalous (e.g., by analyzing traffic 508 using its machine learning-based anomaly detector). However, there may still be additional traffic flows in the network that are not visible to DLA 506. Typically, this happens in situations in which the additional flows are intra-branch flows that are only visible at the switch level within the branch. For example, while DLA 506 is able to assess traffic 508, it may not have visibility to intra-branch traffic 510 exchanged between hosts 502b and 502n via intermediate networking devices 504.

As shown in FIG. 5A, one aspect of the techniques herein introduces a newly defined discovery message 512 that is sent by the network element (e.g., a router, switch, etc.) configured as a DLA, in order to discover the ability of other nodes in the network to perform anomaly detection functions. Such functions may include, for example, the ability to compute and/or execute a machine learning-based anomaly detection model. In other cases, these functions may include the ability of the node to capture traffic flow data of interest. For example, router/DLA 506 may send message 512 into the local network to discover other learning agent-capable devices 504 on the LAN, as well as any switches or other devices 504 that are not capable of computing models but can still provide traffic flow data to such a computation device. Note that such a scenario is fairly common when low-end switches are crossed by traffic of high interest for purposes of detecting lateral movements of malware, but the switches themselves are not able to compute a machine learning-based anomaly detection model due to lack of processing power.

Figure 5B:
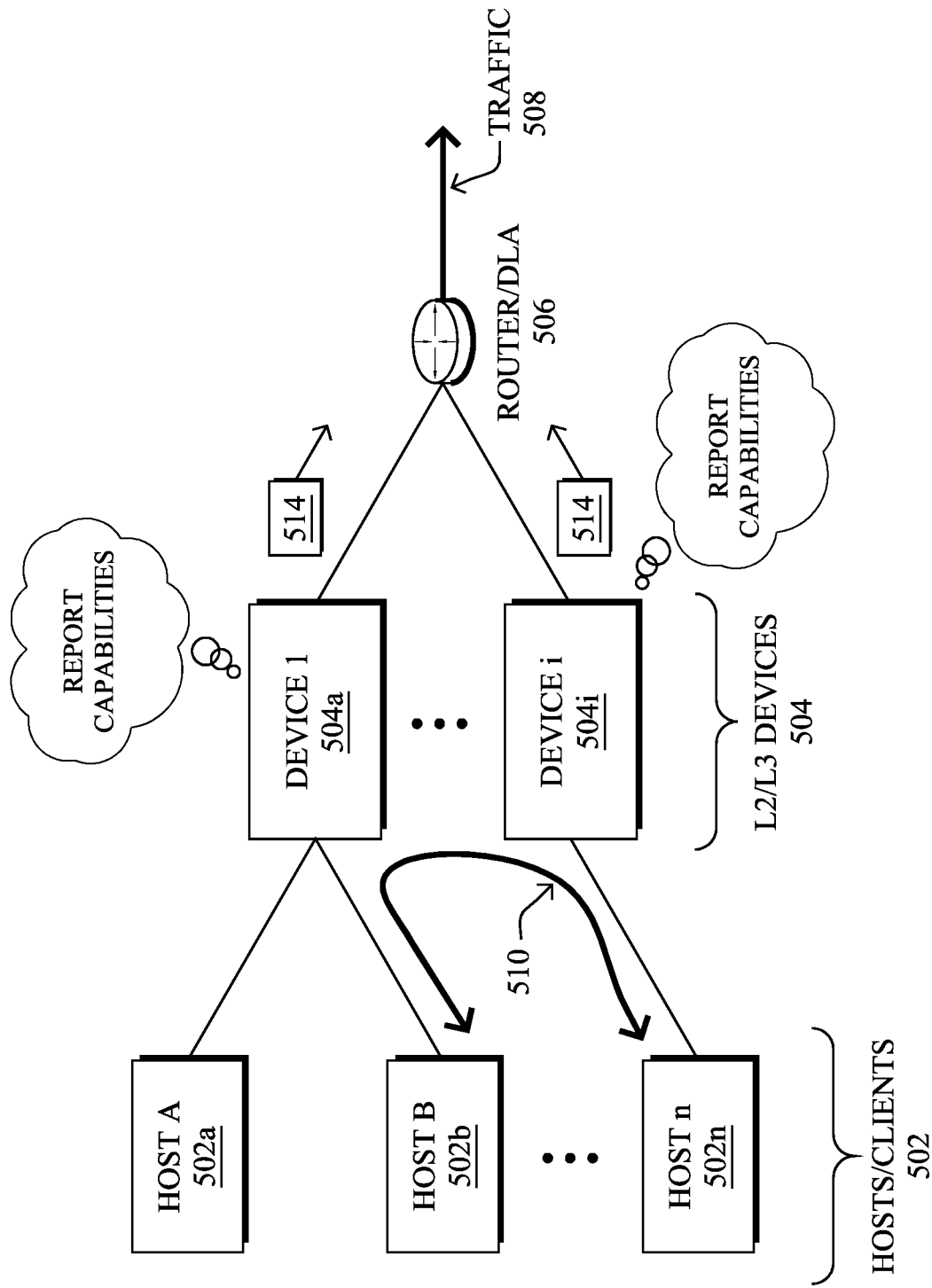

As shown in FIG. 5B, another aspect herein relates to a newly defined message 514 for the SLN elements (e.g., devices 504, etc.) to exchange the details of their roles and relationship. For example, message 514 may include details such as the expected number of flows seen, the type of applications, number of flow messages generated, or the like. Message 514 may also include a response from the SLN compute element about its abilities to compute models based on the details provided by the SLN sensor element (e.g., via message 512). In one embodiment such capabilities may be static and provide upon request. In another embodiment, devices 504 may send out messages 514 as status updates, in response to detecting the presence of new flows (e.g., according to matching rules provided by the requester), or to signify a change in the amount of processing power available to eventually off-load model computing work.

In another embodiment, a coordination mechanism is used in order to prevent different nodes (e.g., devices 504) from providing multiple reports about the same flow, in order to prevent double counting that would distort the computed statistics. This can be done, e.g., by the SLN compute element, which would assign to each switch a subnet of the internal network that it is responsible for monitoring. For example, as shown, if devices 504a and 504i both report the ability to capture information regarding traffic 510, DLA 506 may select between the two for purposes of capturing the traffic data regarding traffic 510.

Figure 5C:
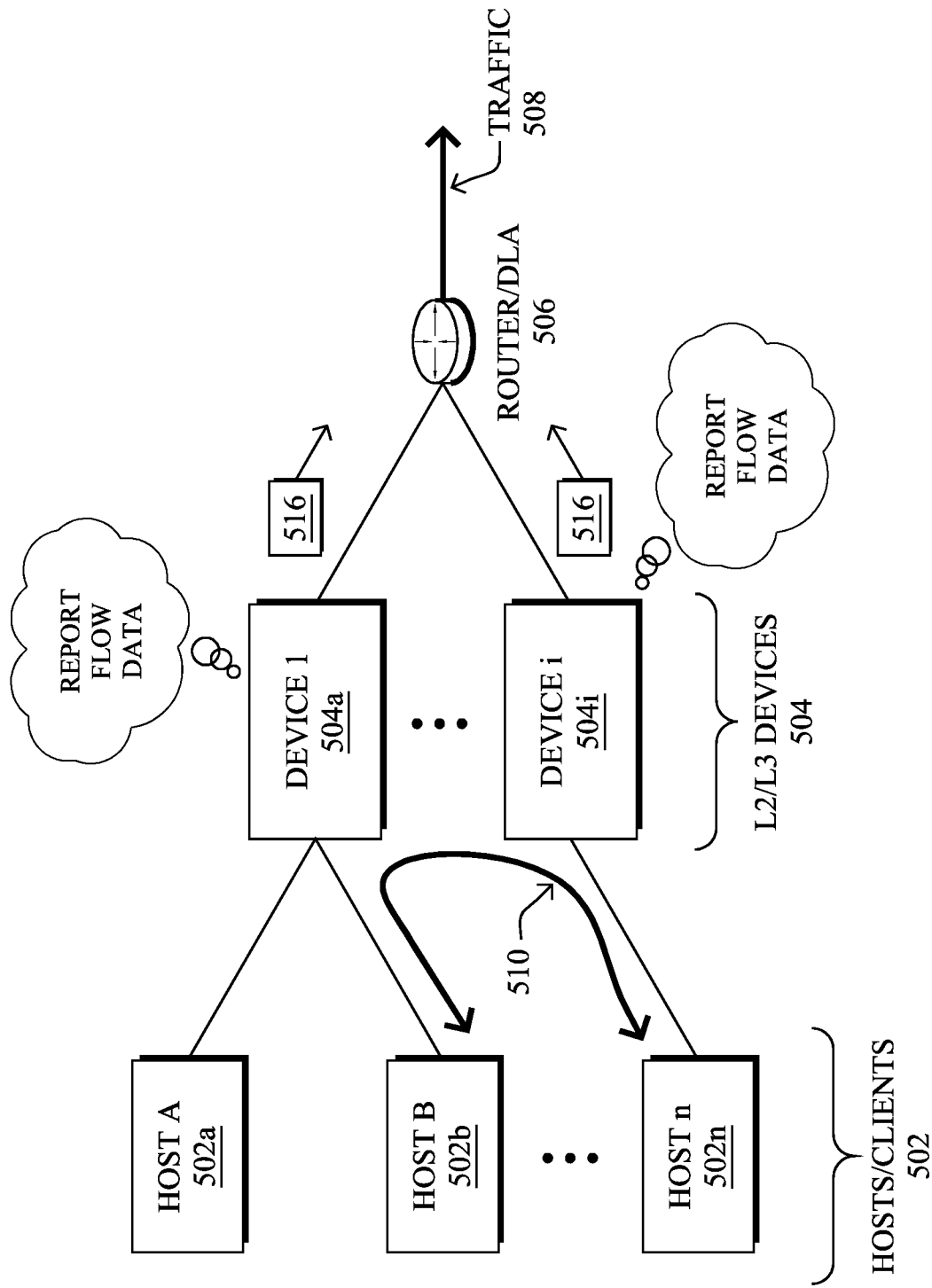

As shown in FIG. 5C, once an agreement has been reached between devices 504 and DLA 506 regarding the traffic monitoring responsibilities, the responsible devices 504 may start to locally generate and consume flow details regarding the assigned traffic flows. In turn, devices 504 may generate regular flow messages 516 sent back to DLA 506 so that DLA 506 can compute the anomaly detection model. As specified above, the traffic data reported via messages 516 may include raw traffic data (e.g., from a Netflow engine) according to rules-based matching (e.g., only send information for flows matching specific criteria) or data locally processed on the switch, router, etc.

In another embodiment, the sensor device 504 can run a local engine in charge of consuming per-flow information generated by its underlying network element and to provide filtered and summarized information to DLA 506. In greater detail the local engine may:
- Receive all of the per-flow information generated by the Netflow engine or other traffic record mechanism.
- Filter only the reports which it has received responsibility for by the computation element. This prevents exporting reports about all of the observed flows to the compute element, DLA 506.
- Aggregate different per flow reports associated to the same conversation (in fact, flow monitoring technologies may produce a number of different reports on the same flow).

Only export per-conversation information when the conversation is considered to be over or upon expiration of a timeout which depends on the maximum delay acceptable by the machine learning process. This allows further reducing the amount of information to be received by the computation element.

If the underlying network element is DPI-capable, the local engine can request a copy of the interesting traffic (after filtering it based on the IPs and the protocols), perform DPI locally, and export the related information to the computation element. For example, if DNS is among the protocols of interest, then the local engine can extract information such as the queried names and the associated responses and export them to the computation element through a novel message.

Figure 5D:
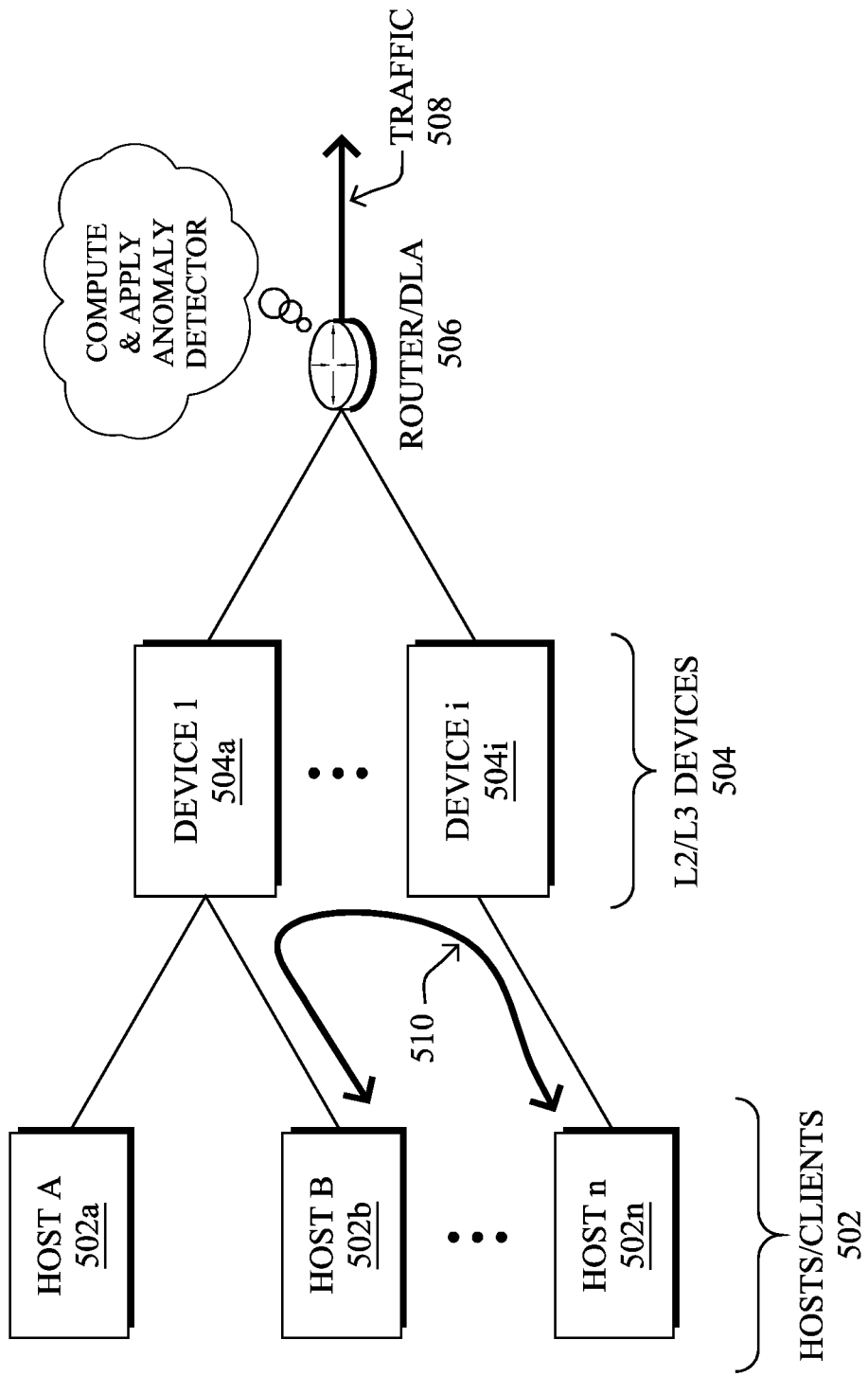

As shown in FIG. 5D, DLA 506 (in this example the branch router) starts the model computation based on the SLN flow messages 516 received from devices 504. At this point, the computation has been offloaded from the sensor (s) 504 completely. Such an implementation then makes use of a distributed processing of data (nodes processing flows of interest, sending the traffic data of interest to DLA 506 for anomaly assessment, etc.). In turn, DLA 506 may go through the motions of building the model and generating anomalies as they arise. If DLA 506 detects an anomaly, the workflow may proceed as described previously, with DLA 506 reporting the detected anomalies upstream to an SCA. In some embodiments, DLA 506 may also indicate to the SCA the device(s) 504 from which the anomalous traffic data was sent to DLA 506 for anomaly assessment, as opposed to the traffic 508 observed directly by DLA 506.

Figure 5E:
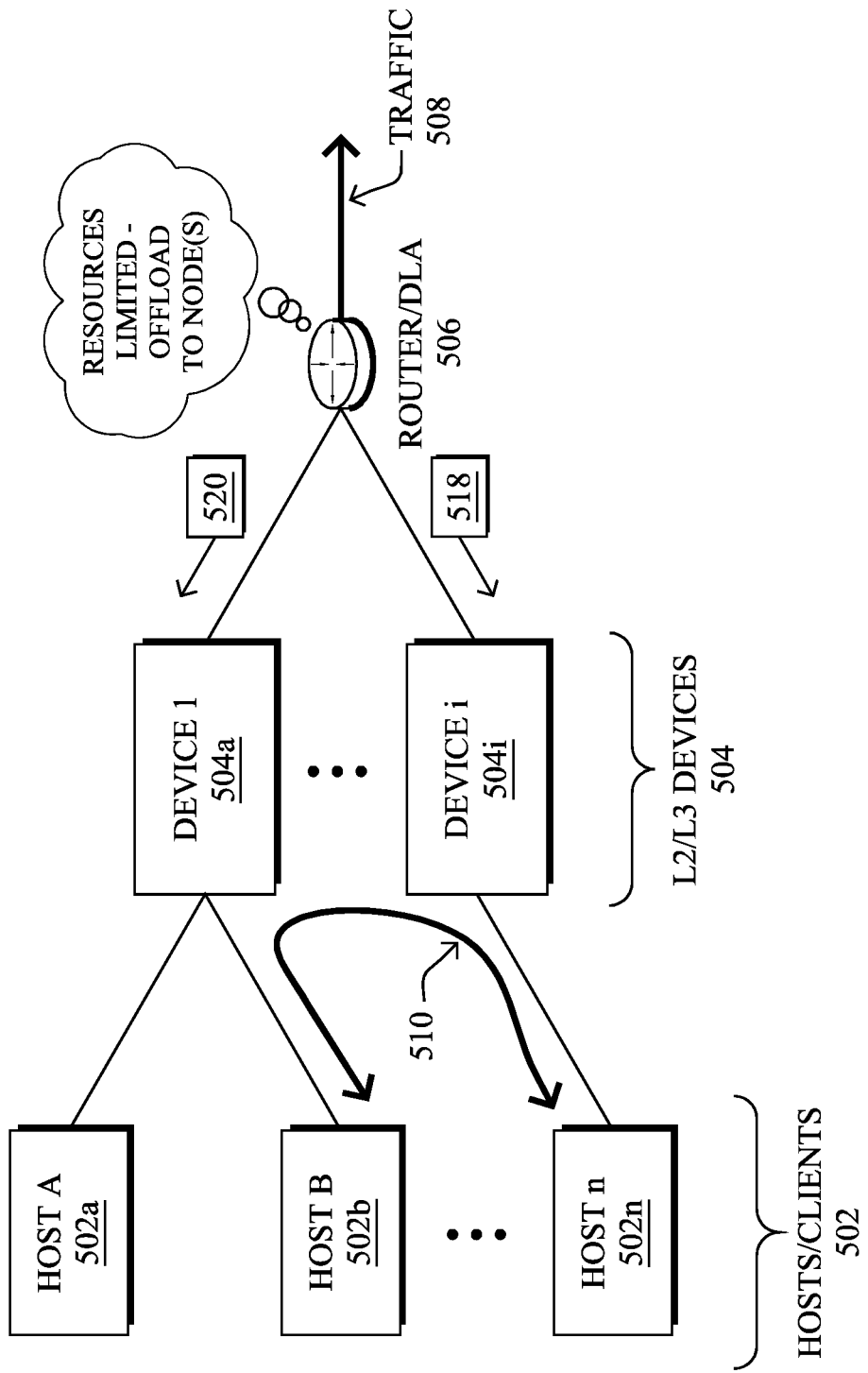

A further aspect of the techniques herein addresses the issue of lack of CPU computing resource by the DLA. For example, as shown in FIG. 5E, assume that the model computation on DLA 506 exceed a threshold amount of locally available computing resources. This does not diminish the need to continue to detect anomalies in the network. In such a situation, DLA 506 may assess the ability of devices 504 to perform the model computation functions, so that DLA 506 can potentially offload the computations to the devices 504. Notably, as described above, the exchange of messages 512-514 allows DLA 506 to identify which of devices 504 are also capable of computing a machine learning-based anomaly detection model.

As would be appreciated, some implementations may rely on a central controller to orchestrate the offloading of model computations from a given DLA. However, such an approach may not be possible in highly distributed systems. In particular, in many SLNs, there might be dozens of learning agents (e.g., up to 10,000 in existing network). In such cases, having the DLAs send computation requests to a central orchestrator may not be possible.

In various embodiments, DLA 506 may offload the anomaly detection model computation to a new compute element (e.g., one or more of devices 504), which maintaining the current state of the model. As shown, DLA 506 may select one or more of devices 504 to continue the modeling based on their reported capabilities. For example, if device 504i has sufficient resources to continue building and executing the anomaly detection model, DLA 506 may select device 504i for offloading the model computation.

To ensure that the current state of the model is maintained, DLA 506 may send a custom message 518 to the selected device(s) 504 that includes the parameters of the model, its dependencies, etc. In particular, each machine learning model may be associated with a particular state, which represents all of the information that has been "learned" from the observed traffic (e.g., from the time the system was first started). The nature of this information is strictly related to the aspect of the network traffic that is being modeled by the machine learning processor. For example, if the machine learning processor is modeling the transactions among different groups of hosts in the network, the model will comprise the statistics for the observed transactions belonging to an edge between two groups. In that case, the learned information can be represented as a set of histograms of several aspects (duration, bytes, etc.) of the flow belonging to a particular edge. This kind of representation allows for the migration of the "learned" information from one processing element to another.

If DLA 506 opts to offload its model computation functions due to a lack of computational resources, DLA 506 may also send a new back-pressure feedback message 520 to any of the other devices 504 that forward traffic data to DLA 506. For example, assume that device 504a (e.g., a switch deeper in the local network) forwards traffic data regarding traffic 510 to DLA 506 for purposes of anomaly detection. If DLA 506 later offloads its model computation to device 504i, DLA 506 may also send a message 520 to device 504a so as to pace, or stop, sending flow-based related information to DLA 506.

Figure 5F:
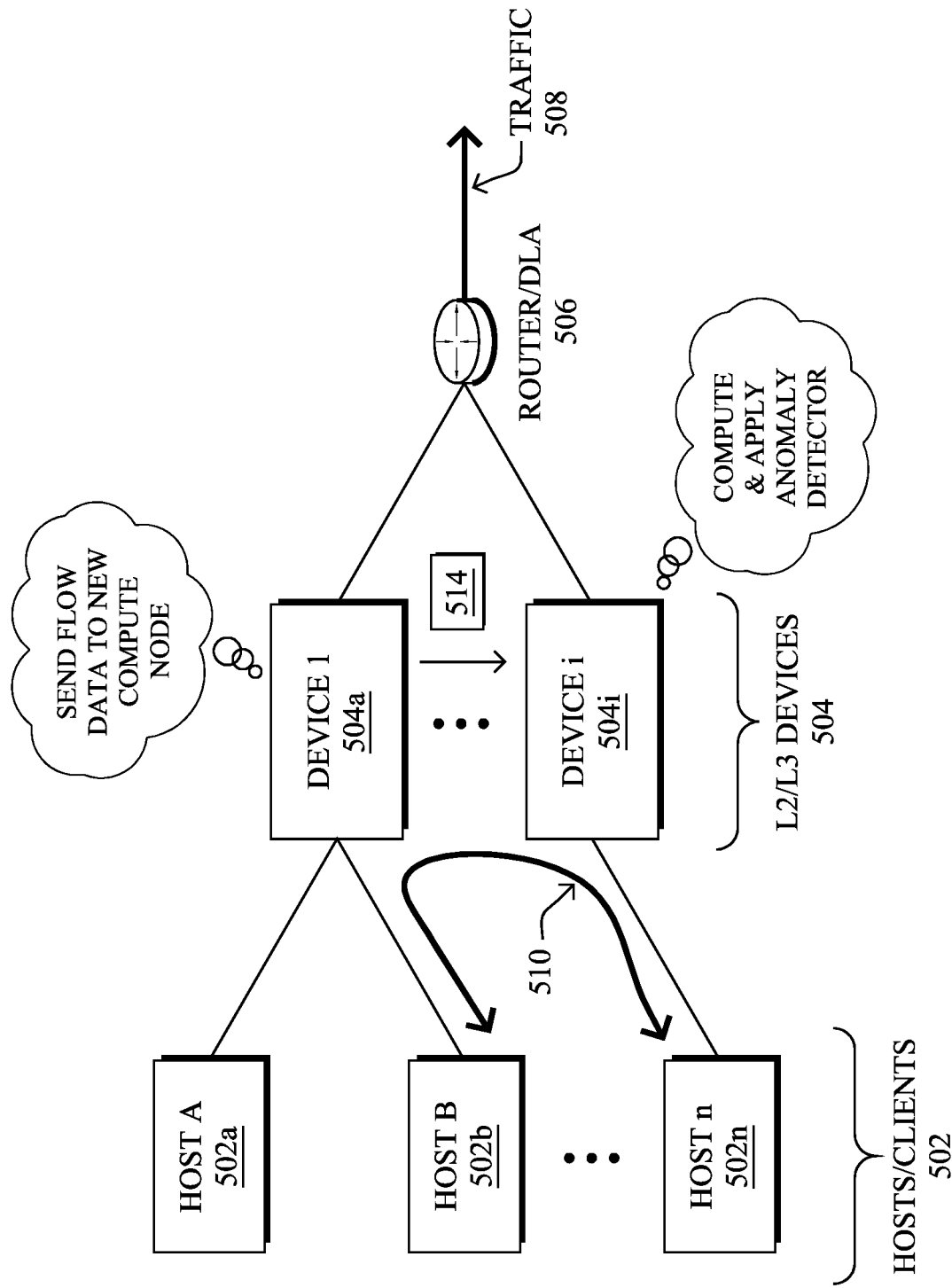

As shown in FIG. 5F, the traffic flow data messages 514 that are driving the computation of the model are then redirected to the new compute element, device 504i. This may be done in two steps. First, flow messages 514 may be rerouted from the original element computing the model, DLA 506. Second, the export destination from where the SLN flow messages 514 are originating (e.g., device 504a) is changed to point to the new SLN compute element, device 504i. To that end, a local multicast message 520 may be sent to the remote sensor node so as to update the sending of flow related information to the new computing node. This allows the previous SLN compute element, DLA 506, to completely offload all of the moving parts to the new element, device 504i.

In another embodiment, DLA 506 can split the model computation functions among multiple nodes 504 of the local network. The feasibility of this load balancing mechanism depends strictly on whether the nature of the machine learning process allows parallelization. This is the case, for example, if per host modeling is performed or if graph modeling is performed separately for different applications. In this case, multiple processing elements can be designated from among devices 504 and only a subset of the input message can be redirected to each of them.

In another embodiment, a further optimization is performed by leveraging the possibility of consuming the per-flow and DPI information locally, on the very same network element/device 504 which is monitoring the traffic. For example, if two switches of the local network in devices 504 observe two separate portions of the traffic, the machine learning processing can be load balanced by having each of them consume the information about its monitored traffic locally.

The new compute element, such as device 504i, is then responsible for generating the anomalies and communicating detected anomalies to the SCA. This can be done in many ways. In one embodiment, the new compute element communicates directly with the SCA to report detected anomalies. In another embodiment, anomalies are relayed to the original element (e.g., DLA 506) that then relays it back to the SCA.

In some embodiments, the processing can be offloaded back to the original network element if the CPU utilization returns within limits. For example, if DLA 506 later has sufficient resources to compute the anomaly detection model, the model computation can be returned to DLA 506 in a manner similar to the above steps, with the direction of the offloading being reversed.

The techniques described herein, therefore, provide for using the network nodes themselves as a platform for dynamically distributing learning agent computations. In particular, the techniques herein have several advantages. First, the techniques allow the SLN to leverage computational resources from all supporting network devices used by the learning agent, allowing the agent to use its own resources more efficiently and to support larger networks and high volume of flows. Second, the techniques allow for DPI processing to be distributed to the network devices within the network as well, allowing any processing overhead to be reduced from the learning agent. Third, the techniques allow for the computation of models locally on network devices and shared with the DLA to aggregate and fuse the models.

Distributed Packet Capture in Support of Anomaly Detection

As noted above, a DLA may capture packets for purposes of anomaly detection. For example, the DLA may maintain a packet buffer, to keep capturing packets. However, because of the limited resources on the DLA, this severely limits the amount of packets that can be captured, which is particularly true for high-speed environments such as campus gateways. Notably, simply increasing the size of the packet buffer on the DLA may not be scalable and will consume additional resources on the DLA. Additionally, when the DLA does detect an anomaly, the DLA then has to spend computation cycles to go through the buffer and systematically pick the packets that were associated with the anomaly. Then, in turn, the DLA must convert the packets into a format that can be shared with the investigators (e.g., the SCA, a user, etc.) and send this information to the SCA, all of which further consume processing resources on the DLA.

The techniques herein further introduce a distributed packet capture infrastructure coordinated by DLA. In some aspects, the techniques propose a newly defined communication and data sharing mechanism to share and coordinate captured packets with detected anomalies in a decentralized fashion. Said differently, the techniques herein address the issue of large scale packet captures, to supplement the anomalies reported by a DLA, thereby allowing investigators to get detailed packet level information about the anomaly.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 6A:
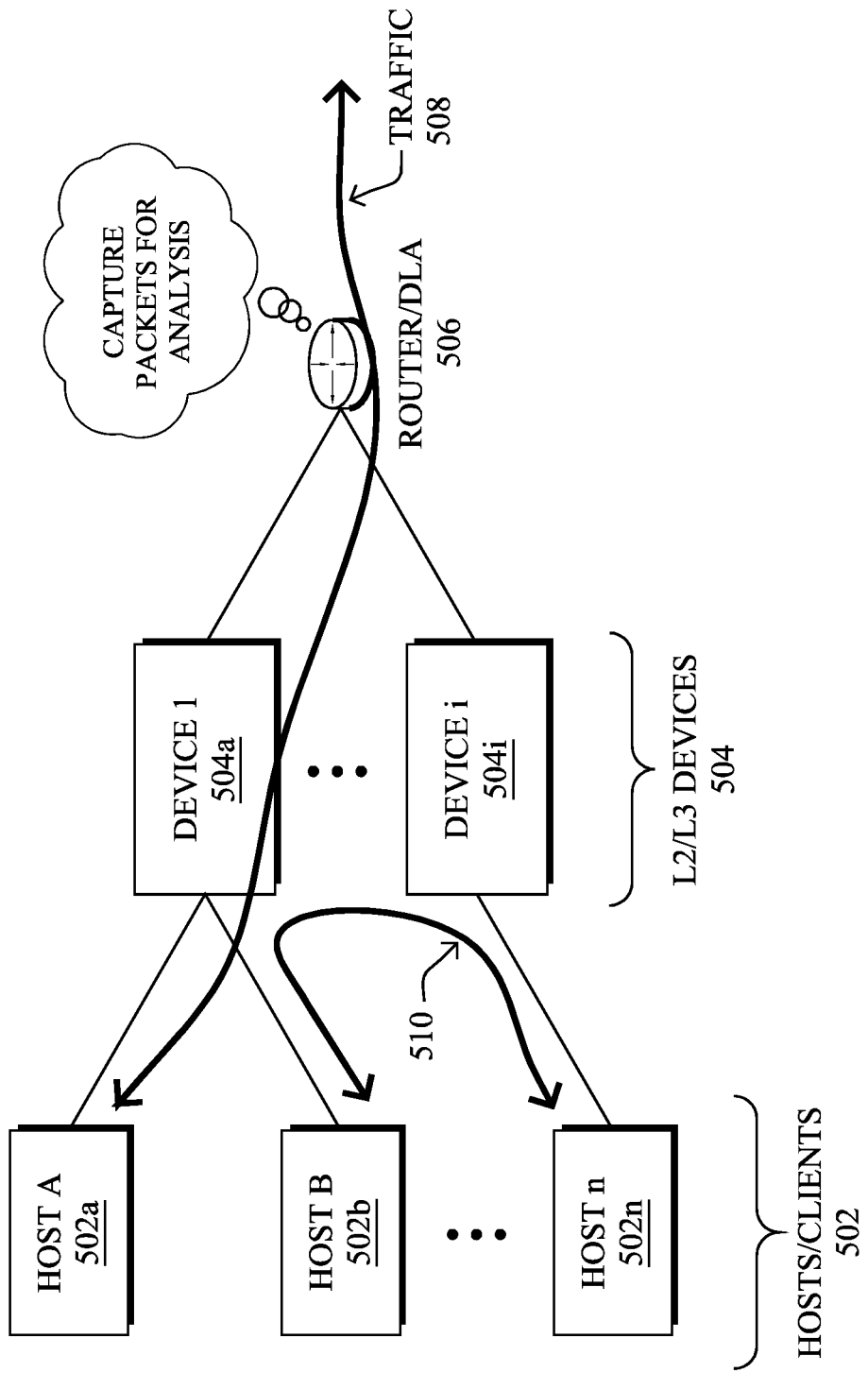
FIGS. 6A-6D illustrate examples of a DLA coordinating packet capture functions.

Operationally, and with general reference to FIGS. 6A-6D, a first problem may arise because the storage resources of a networking element are not correlated with the supported throughput of the element. Due to this issue, network elements that see and support a high throughput of data will never have sufficient storage resources to capture packets over a large span of time. Notably, in many current systems, this is on the order of minutes. Consequently, this reduces the look-back period that the DLA has when anomalies arise, limiting the number of anomaly-related packets that the DLA can share with the investigators/users. For example, as shown in FIG. 6A, router/DLA 506 may be able to capture and store only a limited amount of packets that are part of traffic 508 for purposes of reporting the packets when DLA 506 detects traffic anomalies.

In some embodiments, DLA 506 may leverage the discovery mechanism described with respect to FIGS. 5A-5B, to discover the ability of devices 504 to capture and store packets that are visible to them. As an example, the network element doing the analytics (e.g., the DLA) could be a branch or campus router whereas the other elements could be L2 switches. For example, if device 504a also has visibility of traffic data 508 in the network, it may report these capabilities to DLA 506 via message 514, described previously. Optionally the response can describe the portion of traffic that the network devices 504 are able to monitor. This can take the form of a list of IP/MAC addresses or an access control list (ACL), in various cases.

For the subnets that do not have network devices 504 able to capture packets, DLA 506 may continue to maintain a buffer to capture those packets. DLA 506 may also maintain a database of which of devices 504 has visibility into which subnet, so that DLA 506 know which of devices 504 to contact for packet details when anomalies are found in a particular subnet.

The distribution of packet capture responsibilities across devices 504 will ensure that individual network elements will have the responsibility to capture packets visible to them, rather than requiring DLA 506 to take over this responsibility for the whole network. This will result in the availability of storage using a distributed approach and, as a result, significantly more packets that will be available for analysis when anomalies are found.

In another embodiment, the attribution of the portion of traffic to monitor to each of the network devices can be established based on a load balancing criterion. In particular, if the topology information available to DLA 506 shows that two switches are observing the same traffic flow, only one of them will be instructed to monitor the flow. For example, if both of devices 504a and 504i are able to capture packets from traffic flow 510, DLA 506 may select only one of the two devices to capture the packets.

Figure 6B:
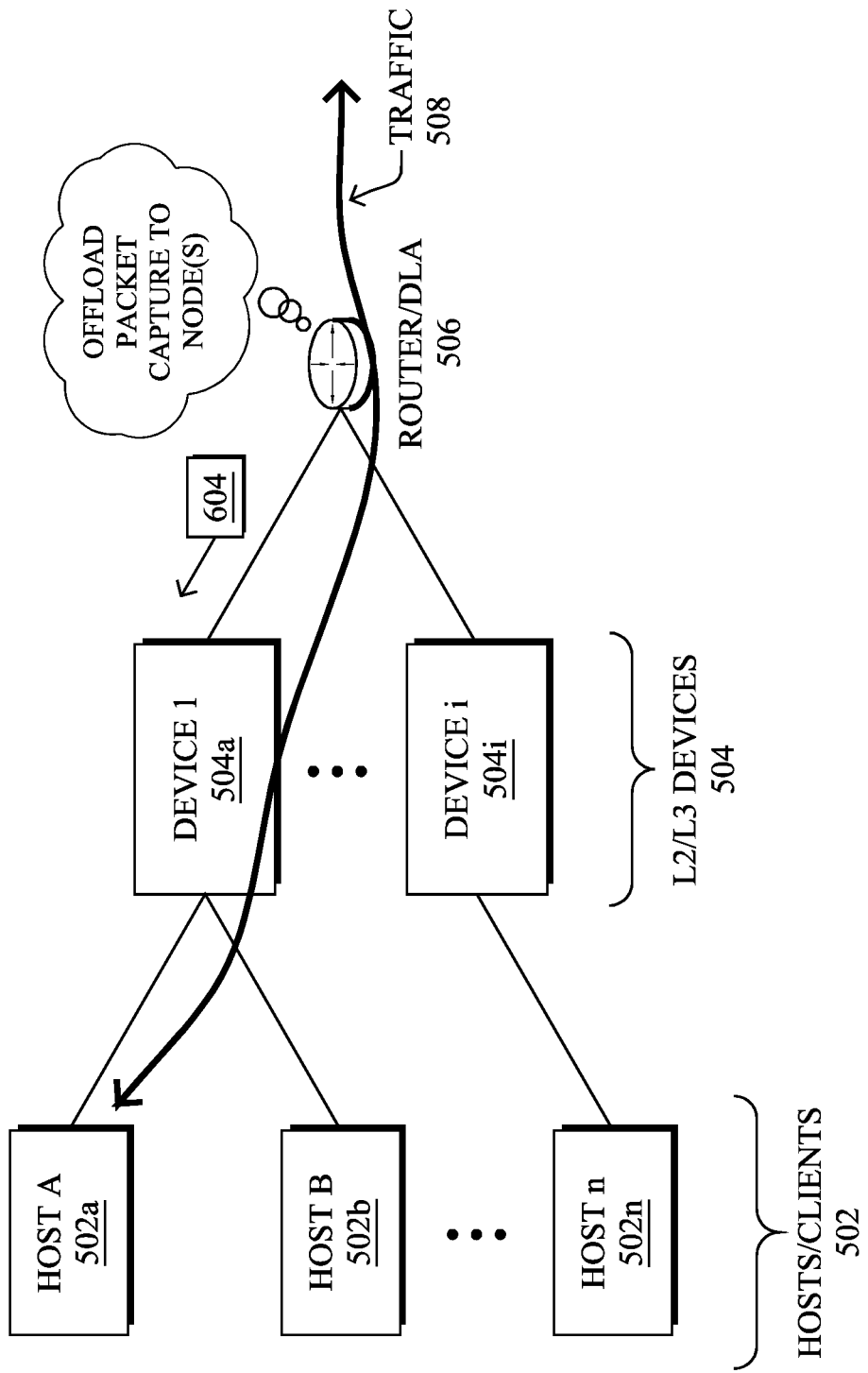

As shown in FIG. 6B, DLA 506 may distribute the packet capture responsibilities of storage-capable devices 504 by sending a newly defined store_traffic( ) message 604 to the selected devices 504. Message 604 may include, for example, an ACL specifying the portion of traffic the receiving device 504 is in charge of capturing. For example, message 604 may instruct device 504a to capture packets from traffic 508 associated with host 502a.

Figure 6C:
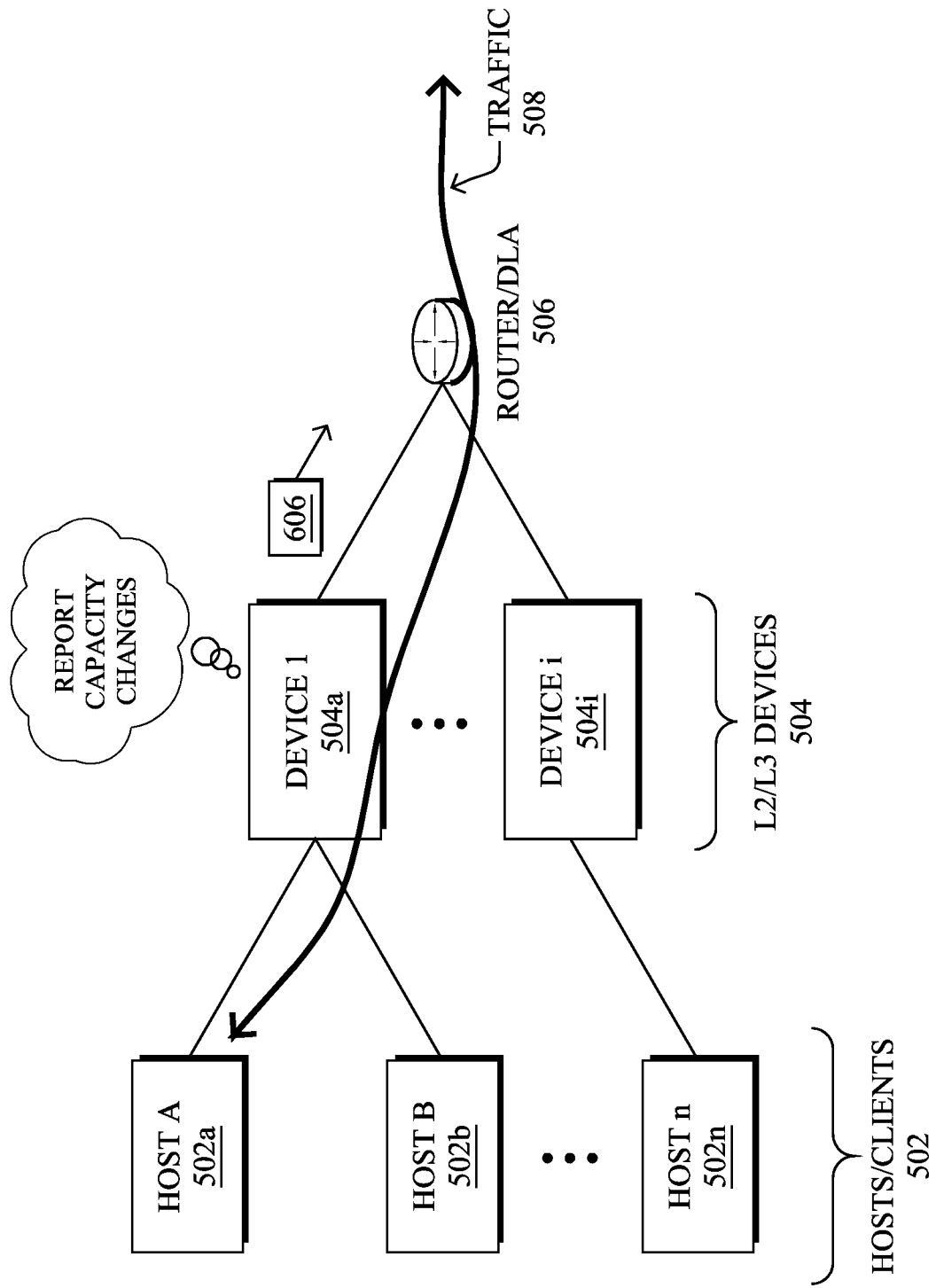

Note that the storage capacity of a device 504 may vary in time. In some embodiments, devices 504 may send unsolicited capacity updates back to DLA 504, to notify DLA 504 of their updated capacities to capture and store packets. In turn, DLA 504 may readjust the packet capture responsibilities of devices 504, accordingly. For example, if DLA 504 discovers that a particular device 504 has a large amount of available storage capacity, DLA 504 may require this node to store traffic flows that are likely to have larger volumes, thus freeing up other network elements in devices 504 from storing packets). In greater detail, as shown in FIG. 6C, each of the capturing network devices 504 may periodically send a storage_caoacity_info( ) message 606 back to DLA 506 describing the occupational state of its buffer. Based on messages 606, DLA 506 can potentially decide whether to reassign packet capture functions to different devices in devices 504.

When DLA 506 detects an anomaly, DLA 506 may query its local database of devices 504, to identify those of devices 504 responsible for capturing the packets associated with the anomaly. For example, if DLA 506 determines that traffic 508 is anomalous, it may determine that device 504*a* is responsible for the capture of packets from traffic 508 using its local database.

Figure 6D:
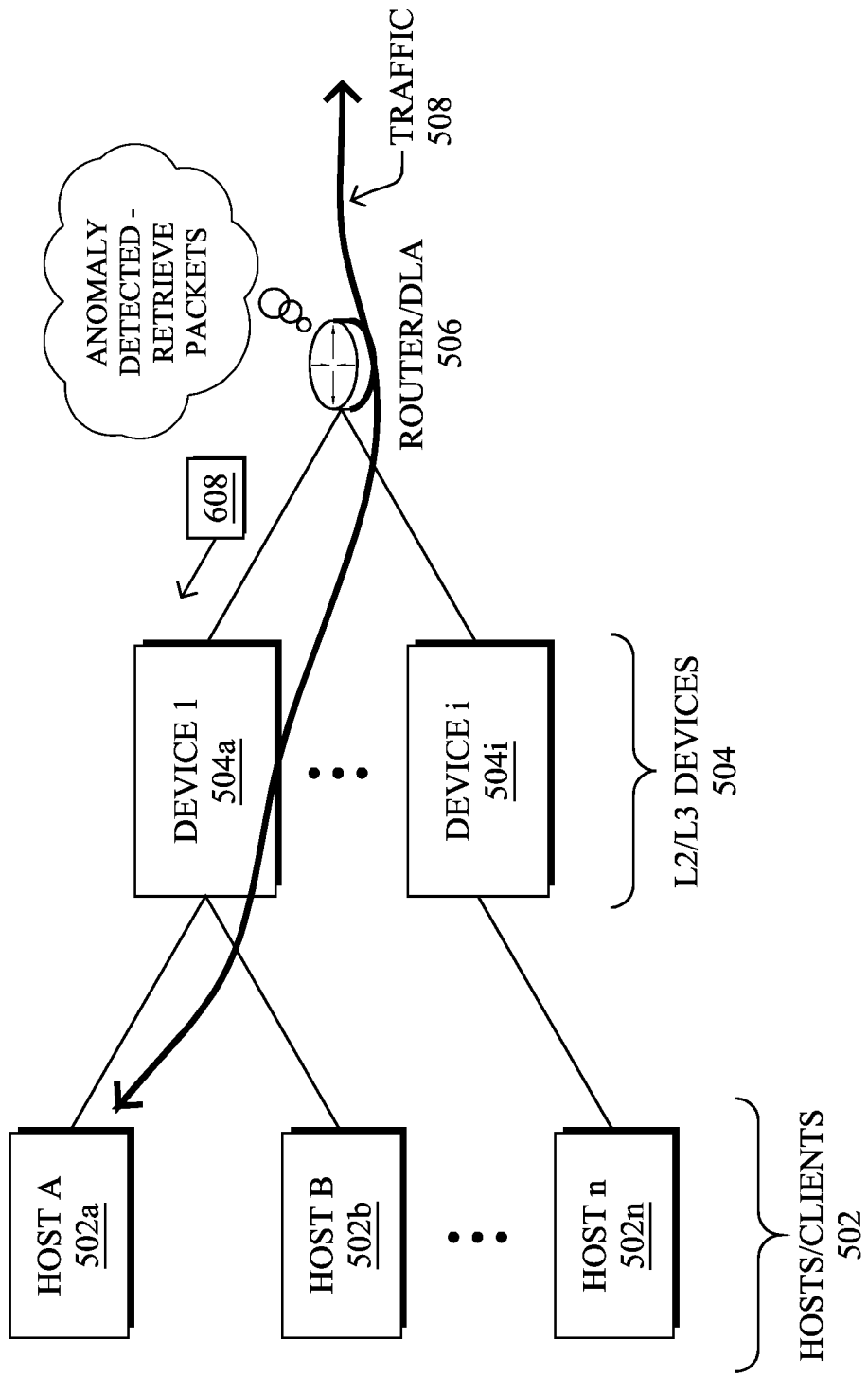

As shown in FIG. 6D, once DLA 506 has identified those of device 504 responsible for capturing the packets associated with the anomaly, DLA 506 may retrieve the packets associated with the anomaly from the devices. In some embodiments, DLA 506 may send a newly defined message 608 to the network devices 504 capturing the required packets (e.g., the packets of flows found anomalous by DLA 506). Messages 508 may include, for example, metadata regarding the detected anomaly such as the details of the end points involved with the anomaly, the time of the anomaly, etc.

Next, in response to receiving message 608, the network device 504 that is capturing the packets may go through its packet buffers and isolate all of the packets that contain end-points involved in the anomaly. This provides a viewpoint into how the endpoints have been behaving besides the direct interaction with each other. For example, if DLA 506 determines that traffic 508 associated with host 502*a* is anomalous, device 504*a* may retrieve from its buffers all traffic associated with host 502*a*. In other embodiments, device 504*a* may retrieve the captured packets according to any criteria included in message 608 (e.g., time period, address ranges, etc.).

In some embodiments, the packet capture device(s) 504 may extract the requested packets into a format that can be shared directly with the investigators via the SCA. Details regarding the connectivity of the SCA may be included in messages 608 and the packet capture device(s) 504 may send the requested packets back to the SCA in the requisite format. In another embodiment, the requested packets are first sent back to DLA 506, which acts as a mediator. In particular, DLA 506 may perform any or all of the following:

Filter out packet duplicates, if a duplicate preventing assignment strategy has not been adopted.

Merge all of the partial traces received from the network devices into a uniform and consistent trace.

Perform anomaly aware filtering. This may apply a finer grained filter to the captured packets, to identify the packets of interest that explain the anomaly. To do so, DLA 506 can adopt several different approaches, depending on the nature of the detected anomaly. In one embodiment, DLA 506 can match the received packets against the actual flow-level statistics that have triggered the anomaly. In another embodiment, if the anomaly has been detected by using DPI based features, DLA 506 can select the captured packets, accordingly. For example, if anomaly has been associated with very long DNS queried names, DLA 506 may export only DNS packets with long queried names as part of the context reported to the SCA/user.

This process ensures the network element responsible for performing all of the anomaly detection analytics is free of the computational overhead that is required to isolate and send the packets to the central engine. The techniques described herein, therefore, provide for distributed packet capture in support of anomaly detection. In particular the techniques herein distribute the responsibility of packet capture throughout the network by assigning to network elements, such as switches, the task of capturing packets local to their subnets. The techniques also provide for an increased storage space across the distributed devices for the captured packets, thereby increasing the look-back period from which packets can be obtained and giving greater visibility into detected anomalies. Further, the techniques improve the operation of the anomaly detection mechanism by allowing the computation resources related to packet capture to be spread evenly across the network, as opposed to requiring the DLA to perform both packet capture and anomaly analytic functions.

Gathering Traffic Information in a Learning Agent for the Detection of East-West Anomalies Also as noted above, the lateral movement of malware in a network, also known as East-West anomalies, is particularly challenging to detect. These types of anomalies are of high concern from a security perspective and occur when malware moves laterally in a network, in an attempt to propagate and compromise new hosts using a wide variety of vectors and covert channels. East-West anomalies are difficult to detect for a number of reasons: 1) the nature of the covert channels, 2) it is easy to hide this propagation as noise at a place of the network where there is a high volume of traffic (e.g., between two switches, as opposed to over the WAN), 3) the involved areas of the network are usually not equipped with security gear and, thus, there is no visibility into the traffic or any of its characteristics at this location in the network. In addition to this, traffic flow record collection mechanisms, such as Netflow and the like, cannot be used due to detect such anomalies due to the very large amount of flows. Indeed, even in presence of Netflow collector sending all Netflow records to a central site for analysis, it becomes nearly impossible for the site to detect East-West anomalies in view of the sheer amount records coming from a high speed switch which may handle millions of flows. Sampling traffic flow records also does not solve the problem, as it provides very limited visibility and an incomplete picture of the state of the traffic.

Thus, using DLAs on premise becomes very compelling and alleviates the need to send Netflow or similar traffic records to a central server for analysis. Further, it becomes possible with DLAs to inspect traffic on premise in real-time thanks to DPI technologies, which is often required for East-West traffic (e.g. observing login attempts, lateral scans, brute force mechanisms, etc.). Notably, the most straightforward SLN implementation deploys DLAs at the very edge of the local network for purposes of anomaly detection. Although next-generation switches will be capable of supporting all required resources to act as a DLA, especially floating point calculation with more memory, most current generation switches are limited to software floating point, which does not allow for a full blown DLA implementation.

The techniques herein, therefore, propose an approach to automatically discover the networking devices (e.g., switches, etc.) that forward East-West traffic and leverage this information so that a DLA co-located in the network (e.g., an edge router) can model this traffic, to detect East-West anomalies. Said differently, the techniques herein specifies an approach to the critical issue of East-West anomaly detection for traffic not seen by a DLA. In some implementations, the system automatically detects the presence and location of East-West traffic in the network. In other implementations, a central controller requests anomaly detection modeling for a specific host that meets a set of requested criteria. Such a request received by a DLA may, for example, triggers a deep network search to retrieve the traffic of interest and redirect the traffic data to the DLA for performance of the anomaly detection modeling. Once the traffic characteristics are retrieved (e.g., via Netflow records, DPI, etc.), models for East-West traffic not seen by the DLA are triggered.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, in various embodiments, a device in a network identifies a set of one or more nodes that convey intra-branch traffic in the network. The device provides the set of nodes that convey intra-branch traffic to a supervisory device. The device receives a selection from the supervisory device of one of the set of nodes that conveys intra-branch traffic. The device instructs the selected node that conveys intra-branch traffic to capture traffic data regarding at least a portion of the intra-branch traffic for assessment by a machine learning-based anomaly detector.

Figure 7A:
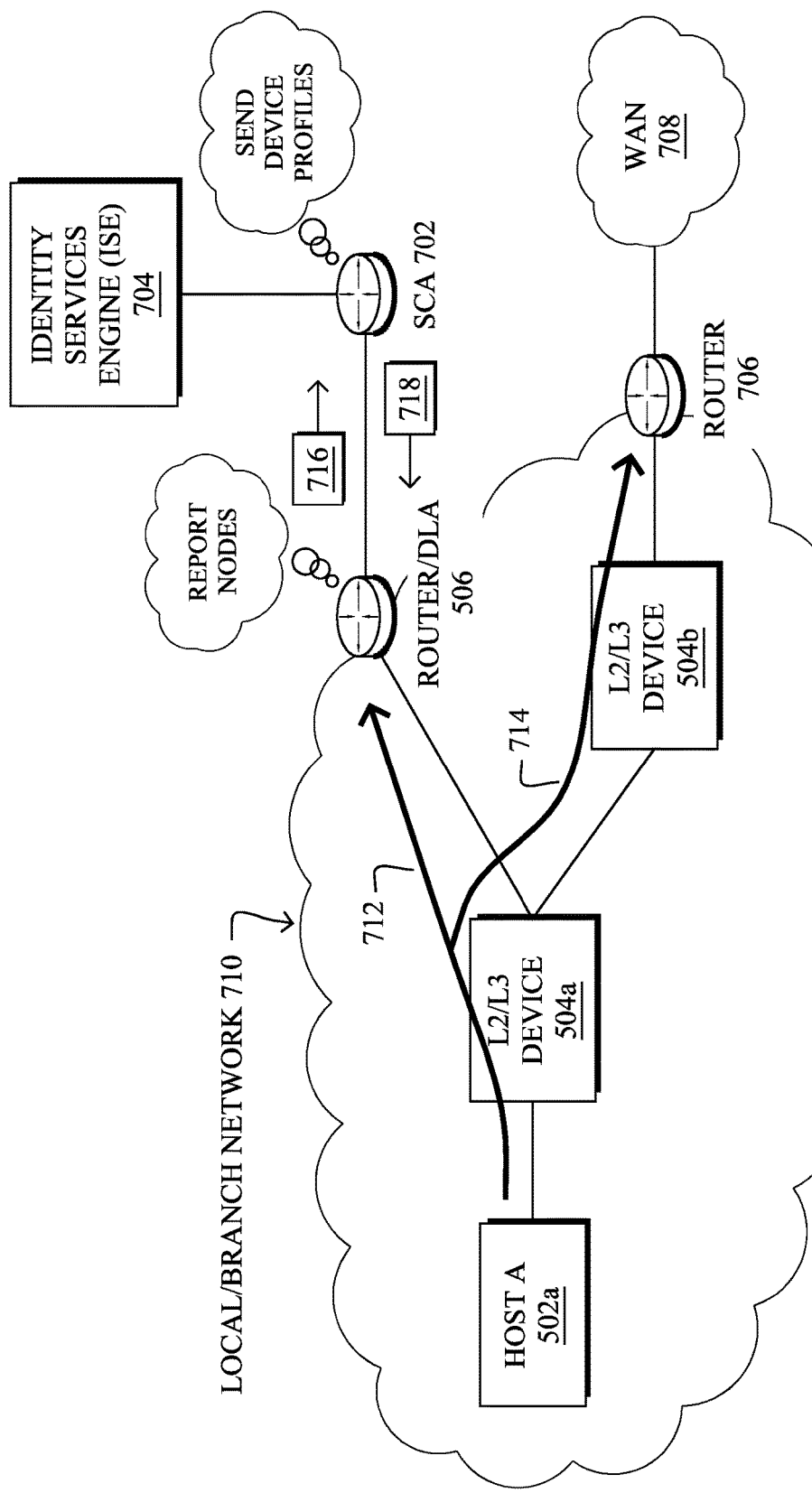
FIGS. 7A-7D illustrate examples of a DLA coordinating the capture of specific traffic.

Operationally, and with reference generally to FIGS. 7A-7D, a core component of the techniques herein is the automatic discovery of switches or other networking devices 504 co-located in the local network with the DLA. In a very frequent deployment scenario, the DLA is deployed on routers connecting the branch to the WAN, whereas several switches are used locally in the branch network to connect devices/hosts. For example, as shown in FIG. 7A, router/DLA 506 may be an edge router on the edge of local/branch network 710 and communicate with SCA 702, which provides supervisory control over DLA 506 and may send information regarding anomalies detected by DLA 506 to a user interface for review by a user.

Also as shown in FIG. 7A, local/branch network may include any number of devices 504, such as L2 devices 504a-504b (e.g., switches), that convey packets internally within local/branch network 710. For example, device 504a may convey traffic 712 from a host 502a towards router/DLA 506.

In various embodiments, DLA 506 may discover the intermediate L2/L3 devices 504 in local/branch network 710 in a number of different ways. In some embodiments, DLA 506 may leverage the discovery mechanism described previously with respect to FIGS. 5A-5B.

In another embodiment, if a spanning tree protocol is active and router/DLA 506 participates in the spanning tree protocol, this allows DLA 506 to discover the L2 topology of network 710. Similarly, should router/DLA 506 be configured to use an IGP, it becomes possible to either find routers with a routing adjacency (e.g., RIP, EIGRP) or all routers thanks to the inspection of the Link State Database with OPSF or ISIS. In turn, DLA 506 can use the layer 2 and 3 routing topologies to locate L2/L3 devices 504 that are co-located with DLA 506 in network 710 and are suspected of carrying East-West traffic that does not transition through DLA 506. Router/DLA 506 may also inspect the Address Resolution Protocol (ARP) table, to find other devices 504 of interest in network 710 that may not be participating in a L2/L3 "routing" protocol. Finally, router/DLA 506 may discover all directly attached devices, such as end hosts, through the ARP table.

Once DLA 506 has discovered the devices 504 in network 710, DLA 506 may identify those of devices 506 that are potentially carrying East-West traffic to construct a list of these devices, $\{D_1, D_2, \ldots D_n\}$. Notably, these devices may be switches, routers, or even end devices such as hosts, in some cases. In some implementations, next generation switches in devices 504 could send out a similar discovery message, as detailed above, broadcasting or multicasting out its own capabilities. In response to receiving such a message, DLA 506 will update its list and start to involve the new element in its learning workflow.

This component allows for dynamically finding the subset of networking devices 504 of interest after pruning devices already enabled with learning capability. The goal is that the subset of devices 504 will have capabilities to support DLA 506 with additional visibility and functionality.

To identify devices 504 of interest, DLA 506 may be preconfigured with policies defining the devices of interest (e.g., all switches, Wifi Access point of Profile X, where X could be critical based on its location, type of traffic handled, end devices except printers, etc.). A newly defined (L2) message called learning-cap( ) is then broadcast/multicast to all local devices for discovering devices equipped with learning capability. In another embodiment the learning-cap( ) message is sent as a unicast message to all devices in the list. In further embodiments, the learning capabilities of devices 504 can be obtained via the discovery mechanism described with respect to FIGS. 5A-5B.

A second step, which may occur in the first place or in parallel, entails retrieving from a policy engine co-located with the central controller (e.g., SCA 702) the list of networking devices of interest. To that end, DLA 506 may send a message 716 to SCA 702 that includes the identifiers of the devices 504 in list D (e.g., a set of MAC address, IP address, etc.). In turn, SCA 702 may gather the corresponding device profiles from an Identity Service Engine (ISE) 704, before returning the sub-list of device of interest to DLA 506 via message 718.

Figure 7B:
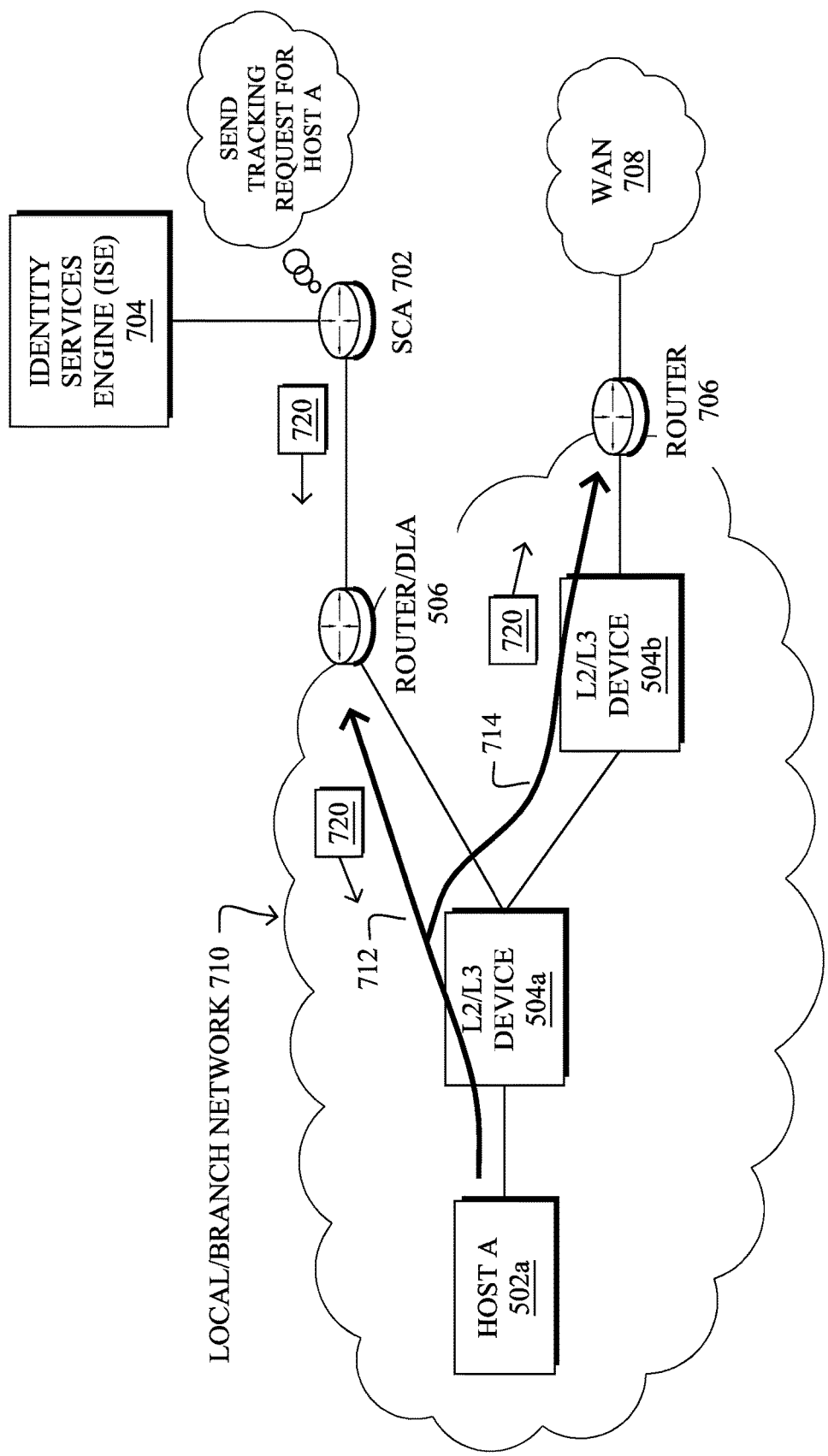

In addition to tracking and detecting anomalies in East-West traffic (e.g., intra-branch network traffic), it is sometimes necessary to build models related to a particular flow (e.g., to/from a device that was flagged as potentially compromised, at risk, or is performing a very critical task from the application point of view). For example, as shown in FIG. 7B, the SLN may also have the ability to specifically trigger tracking of a host 502 of interest and learning its behavior on the fly.

Notably, as shown, SCA 702 may send a track-request( ) message 720 to DLA 506, to explicitly request modeling of the traffic to from host 502a, whose traffic may not be seen by DLA 506 or only partial visibility exists (such as the northbound WAN traffic). As shown, for example, assume that a portion of the traffic associated with host 502a includes traffic 714 that traverses device 504b and router 706 to communicate with WAN 708. In such a case, DLA 506 would not otherwise have visibility into traffic 714 for purposes of anomaly detection and SCA 702 may explicitly request tracking of traffic 714.

As shown, track-request( ) message 720 may be broadcast/multicast by DLA 506 along the L2/L3 topologies in order to find a networking devices 504, such as a switch or a router, that sees such traffic from host 502a that needs to be explicitly tracked.

Figure 7C:
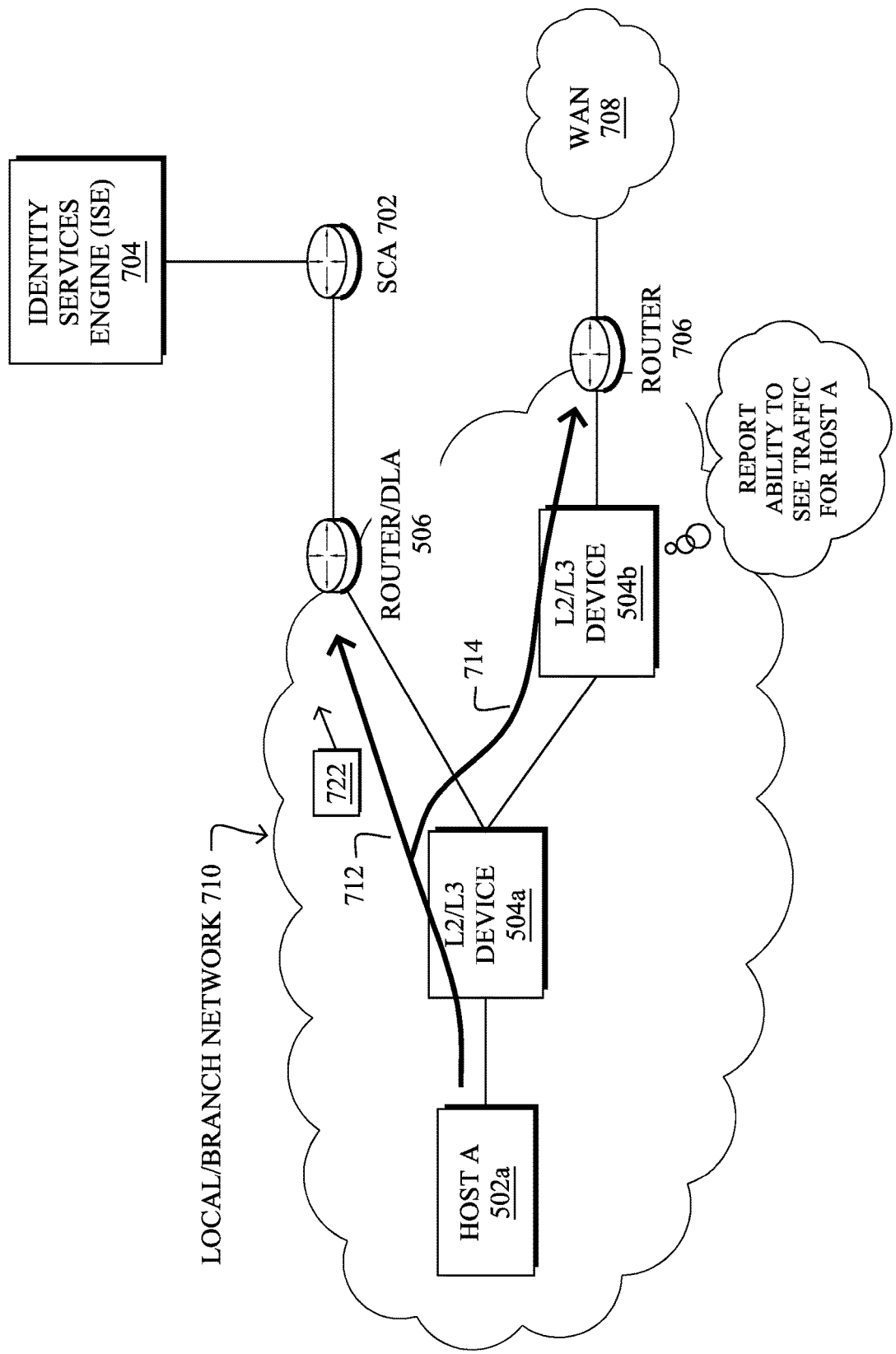

As shown in FIG. 7C, upon receiving the track-request( ) message 720 from DLA 506, a switch/router seeing the traffic associated with host 502a sends back a track-reply( ) message 722 to DLA 506. For example, device 504b may send message 722 to indicate that it has visibility of traffic 714 associated with host 502a. In response, DLA 506 may add the responding device 504 to the list D' of devices 504 of interest.

In one embodiment, if multiple network elements from device 504 respond to message 720, this means that the traffic associated with host 502*a* is traversing multiple L2 spaces. In this case, the closest network element to host 502*a* is picked (e.g., device 504*a*), as this ensures that all traffic will be seen without receiving multiple copies of the same information. In summary, the list D' of devices of interest may comprise the following types of devices that do not support anomaly detection:

- Any device co-located with DLA 506 that is seen in ARP tables;
- Any device (router/switch) present in the branch office network 710;
- Any device (router/switch) that sees traffic from/to an end point (e.g. host) that has been flagged by SCA 702 and/or ISE 704 as being of interest.

Figure 7D:
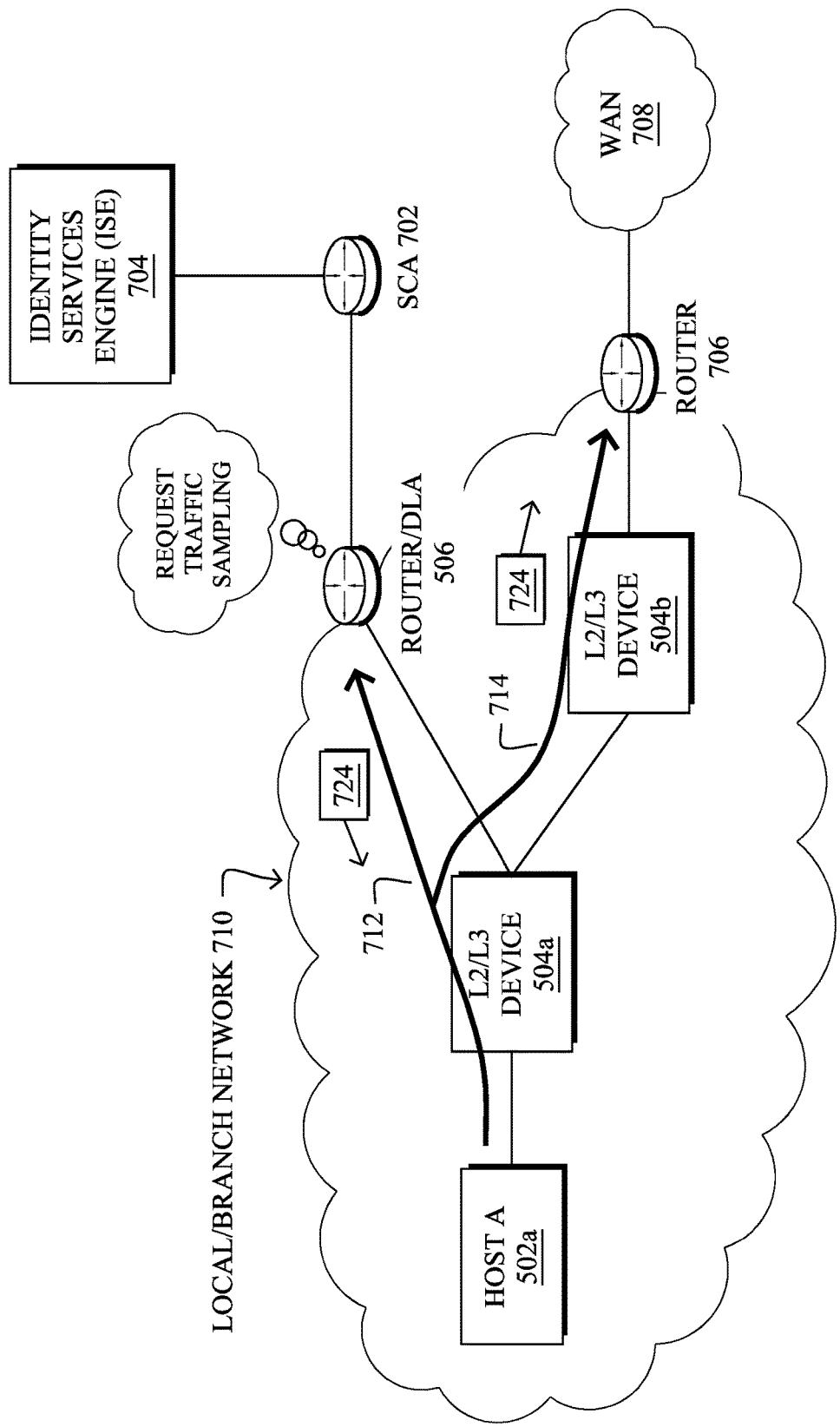

As shown in FIG. 7D, another aspect of the techniques herein triggers a request message 724 called traffic-sample( ) to each device of interest in the list D'. Indeed, it is not always possible for DLA 506 to determine the traffic seen by a device in D'. In one embodiment, DLA 506 may simply request traffic characteristics to be relayed to DLA 506 without any distinction of whether the traffic may be partially seen by DLA 506. For example consider device 504*a* (e.g., a switch) that sees both traffic 712 and 714, but traffic 714 is forwarded to device 504*b*, meaning that DLA 506 does not see traffic 714. In this case, both of devices 504*a*-504*b* may respond back with metadata to DLA 506 that comprise, e.g., a distribution of destination IP addresses, flow durations and sizes, and application distributions, to quantify all the traffic characteristics. Since both of devices 504*a*-504*b* respond in the above scenario, DLA 506 will have information it already sees (e.g., traffic data regarding traffic 712) in addition to the ones it does not see (e.g., data regarding traffic 714).

In another embodiment, DLA 506 may request to gather information regarding the flows of interest that are not visible to it, since some of the flows are already seen by DLA 506. Since DLA 506 does not know a priori which proportion of the traffic seen by the device is also flowing through itself, it may request via messages 724 to receive all traffic for a period of time so as to determine which traffic of interest is not seen by DLA 506. In turn, DLA 506 may compute an ACL that specifies the traffic of interest (e.g., traffic 714). For example if a DLA determines that traffic destined to a specific subnet SU-1 is sent by the device but does not traverse the DLA, the ACL will select traffic for all destination-source that belongs to this subnet, while another ACL may specify all traffic from a specific device, etc.

In another embodiment, the traffic of interest can be selected through negative filtering. In particular, DLA 506 may include in the traffic_sample( ) message 724 a list of the source-destination pairs that it is observing, thus requesting the devices 504 of interest to report all of the traffic which has no matching in such a list. In order to ensure scalability, compressed set representations, such as Bloom Filters, can be used as a representation of such a list.

Whatever the approach, it is likely for the same East-West traffic flow to be observed by multiple devices 504 of interest. Therefore, it is crucial to make sure that statistics provided by different vantage points about the same flow are merged, as this may bring to completely wrong results. In one embodiment, this can be done by installing different ACLs on different devices 504 of interest, in order to have each of them monitor a separate and non-overlapping portion of the East-West traffic. For example, in case the communication is made up of traffic between subnet S1 and S2 and can be observed by switches S1 and S2, the DLA can instruct only S1 to monitor the East-West traffic or to load balance the monitoring activity between S1 and S2 (e.g., S1 monitors traffic from S1 to S2 and S2 monitors traffic from S2 to S1). This kind of solution has the advantage of load balancing the burden of the monitoring activity and to optimize bandwidth usage by avoiding the transmission of duplicate information. However, this optimization problem may become complex to solve in case of involved L2 topologies.

In another embodiment, duplicate information can be removed locally at DLA 506. In particular, DLA 506 can establish that, for a given source destination pair IP1→IP2, only statistics coming from a particular device 504 would be taken into account (i.e., reports about the same source/destination pair coming from different sources will automatically be discarded). This is equivalent to the election of a designated data source for the IP1→IP2 pair.

In greater detail, such DLA-based filtering may work as follows:

- Upon reception of a report about IP1→IP2 communication from source device 502*a*, DLA 506 will look up the designated data source. If the designated source is not 502*a*, the report will be ignored.
- If no designated source is to be found for the IP pair, DLA 506 will arm a timer in order to wait for reports from different sources concerning IP1→IP2. Upon such timer firing up, the designated source will be selected out of all of the possible candidate sources 504, which can be done randomly or based on a load balancing criterion.
- Optionally, DLA 506 can periodically send to the potential sources 504 a list of all of the IP pairs for it has NOT been selected as designated data source. If possible, the device 504 can avoid sending statistics about such IP pairs (notice that a negative filter strategy is chosen in order to make sure that reports about new IP pairs are never suppressed).
- Optionally, DLA 506 can periodically re-trigger the election of a designated data source from devices 504, in order to detect potential switching topology changes (i.e., cases where the designated source is not observing the target traffic any longer).

Still another component of the techniques herein lies in requesting from all devices 504 of interest to send traffic characteristics to DLA 506. As pointed out earlier, not all traffic may be of interest, only traffic with specific characteristics. In one embodiment, traffic characteristics may be of the form of (sampled) Netflow records or other traffic records. Such records may all be redirected to DLA 506, or a subset of them, at specific intervals for the traffic of interest. In many East-West anomalies, machine learning features that are protocol specific may be computed by the anomaly detection module on DLA 506 (e.g., distributed learning component 408). For example, if the anomaly detector models traffic/application to find anomalies such as DNS tunneling, features specific to DNS may be required.

In yet another embodiment, the East-West traffic of interest may also be redirected to an external anomaly detection module, which may not be co-located by DLA 506, to explicitly handle the East-West traffic anomaly detection. In one embodiment, if sampled characteristics show the introduction of new applications, or new hosts or even a new behavior, DLA 506 can trigger the corresponding device of interest to switch to sending full records capturing only the new traffic of interest. As mentioned previously, this can be done using dynamic creation and pushing of ACLs to the device of interest. This switching dynamically from sampled tracking to continuous tracking for selective periods of time to follow behavioral changes is also a key feature. In this situation, new anomalies may arise or no anomalies may arise. Once deemed normal by the network operator, DLA 506 can message the corresponding device of interest to move back to sampled sharing of traffic characteristics.

The techniques described herein, therefore, provide for gathering traffic information in a DLA for the detection of East-West anomalies. In particular, the techniques herein allow for the extension of distributed learning to devices that cannot support a full-blown learning agent, thus greatly increasing the scope of such anomaly detection architectures. Furthermore, a new technique is proposed in order to model traffic from/to traffic to specific host that does not traverse a DLA. In other words, the techniques herein introduce a series of critical mechanisms to extend the scope of distributed anomaly detection functions. In particular, the techniques allow the system to recruit edge devices, such as switches or WiFi access points, to track the activity of potentially infected devices. Further, the techniques do so in a highly scalable manner by triggering the export of traffic characteristics only for specific hosts.

Figure 8:
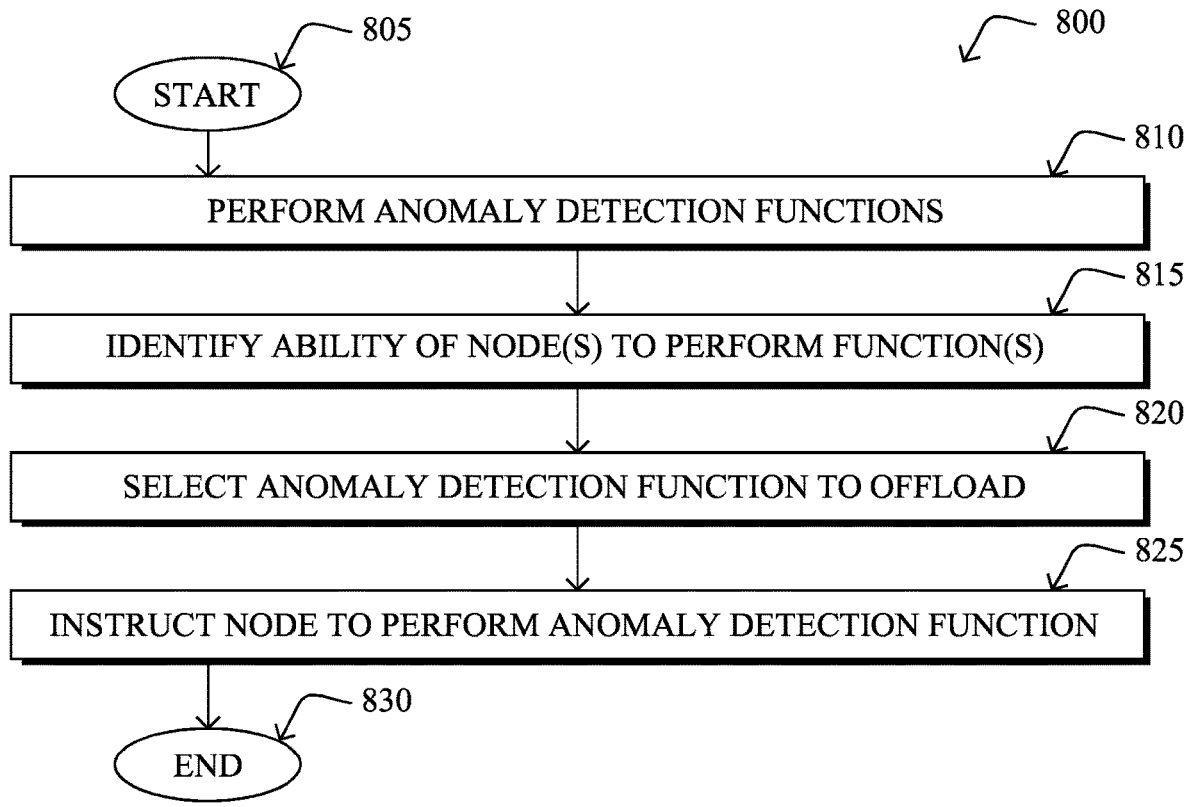
FIG. 8 illustrates an example simplified procedure for implementing distributed anomaly detection management in a network.

FIG. 8 illustrates an example simplified procedure for implementing distributed anomaly detection management in a network, in accordance with various embodiments herein. Generally, procedure 800 may be performed by a specialized networking device, such as an edge router acting as a DLA. Procedure 800 may start at step 805 and continue on to step 810 where, as described in greater detail above, the device may perform anomaly detection functions in the network using a machine learning-based anomaly detector. For example, the device may use machine learning to model the traffic in the network and use the model to detect anomalies. In various embodiments, the device may assess traffic that it directly observes (e.g., traffic conveyed directly via the device) and/or information regarding other traffic flows sent to the device for analysis. In this respect, the anomaly detection functions may entail any or all of: obtaining information about network traffic, capturing and storing traffic packets for later inspection (e.g., if an anomaly is detected), computing a machine learning-based model using the information about the network traffic, using the model to detect anomalies, filtering traffic information and/or anomalies that are of low relevance/interest, and the like.

At step 815, as detailed above, the device may identify an ability of one or more nodes in the network to perform at least one of the anomaly detection functions. Such nodes may comprise, for example, switches or routers located deeper in the network. For example, the device may identify switches or other routers in the network that have sufficient resources to forward traffic information, capture and store packets, compute an anomaly detection model, etc. In some embodiments, the device may send out a request into the network, to learn the capabilities of the devices. The device may also leverage information available to an ISE or SCA, to determine the capabilities of the other nodes.

At step 820, the device may select a particular one of the anomaly detection functions to offload to a selected one of the nodes, as described in greater detail above. For example, the device may determine that a particular node should capture traffic data and/or packets, if that node is able to view traffic that the device cannot (e.g., East-West or intra-branch traffic). In another example, the device may select a node capable of computing the anomaly detection model, if the device has exceeded a threshold amount of resources. In such cases, the device may decide to distribute the computation of the anomaly detection model across multiple nodes, as well.

At step 825, as detailed above, the device may instruct the particular node to perform the selected anomaly detection function. For example, the device may send an instruction to the node to capture certain packets and/or traffic information, to begin computing and applying at least a portion of the anomaly detection model, to forward traffic data to the device, or the like. Procedure 800 then ends at step 830.

Figure 9:
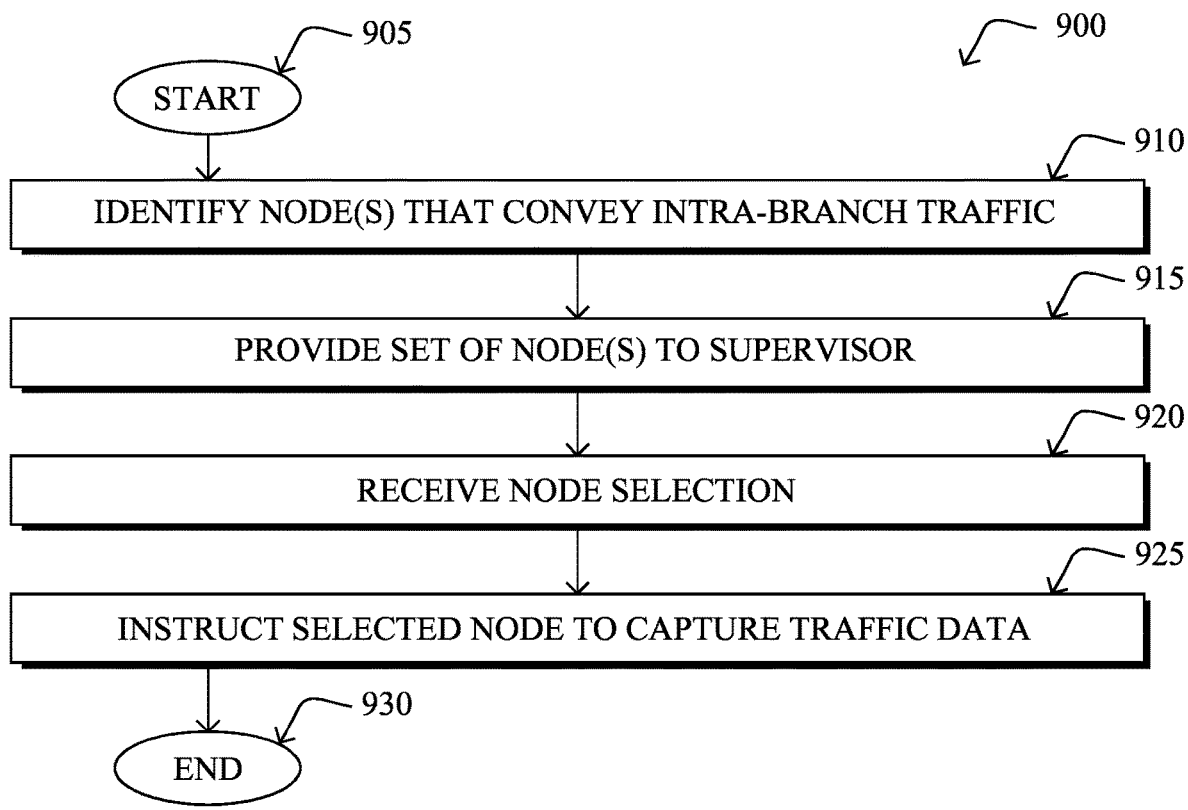
FIG. 9 illustrates an example simplified procedure for instructing a node to capture traffic data.

FIG. 9 illustrates an example simplified procedure for instructing a node to capture traffic data, in accordance with various embodiments herein. Procedure 900 may be by a specialized networking device such as, e.g., a DLA in a network. Procedure 900 may start at step 905 and continues on to step 910 where, as described in greater detail above, the device may identify one or more nodes in the network that convey intra-branch traffic (e.g., East-West traffic). The device may do so in a number of ways such as querying the nodes in the network, assessing the L2 and/or L3 topologies of the network, leveraging information from an ISE, or the like.

At step 915, as detailed above, the device may provide the set of identified nodes to a supervisory device. For example, if the device is a DLA, it may send a set of identified nodes to its SCA that potentially convey traffic for which the DLA does not have visibility.

At step 920, the device may receive a selection of one or more of the nodes in the list from the supervisory device, as described in greater detail above. Notably, the supervisory device may indicate to the device which of the nodes should capture traffic data. For example, if one of the nodes has visibility into a traffic flow that the device does not, the supervisory device may select this node to either begin forwarding information regarding the flow to the device for anomaly assessment or, conversely, begin performing its own anomaly assessment of the flow.

At step 925, as detailed above, the device may instruct the selected node to capture traffic data regarding one or more of the traffic flows. For example, the device may instruct a given node (e.g., a switch, router, etc. in the network) to begin capturing traffic information regarding a particular host, set of hosts, application, protocol, or the like. In turn, the node may, in some cases, send the captured traffic data to the device for assessment by a machine learning-based anomaly detector executed by the device. Procedure 900 then ends at step 930.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

While there have been shown and described illustrative embodiments that provide for distributed anomaly detection management, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    performing, by a device in a network, anomaly detection functions using a machine learning-based anomaly detector to detect anomalous traffic in a branch network, wherein the device is an edge switch or an edge router that connects one or more host devices and one or more intermediate devices in the branch network to the network;
    identifying, by the device, an ability of one or more nodes in the branch network to perform at least one of the anomaly detection functions, wherein the one or more nodes are the one or more host devices or the one or more intermediate devices in the branch network;
    dynamically selecting, by the device, a particular one of the anomaly detection functions to offload to a particular node of the one or more nodes, based on the ability of the particular node to perform the particular anomaly detection function, wherein the particular node is a switch or router in the branch network;
    based on the dynamic selection, offloading, by the device, the selected anomaly detection function to the particular node by instructing the particular node to perform the selected anomaly detection function, wherein offloading includes:
        instructing, by the device, one or more of the nodes to forward traffic data to the particular node, and
        instructing, by the device, the particular node to compute at least a portion of an anomaly detection model for the anomaly detector using the forwarded traffic data;
    training, by the device, the anomaly detection model; and
    providing, by the device, parameters of the trained anomaly detection model to the particular node to compute at least a portion of the model by updating the model.

2. The method as in claim 1, wherein the selected anomaly detection function comprises capturing packets for inspection, and wherein instructing the particular node to perform the selected anomaly detection function comprises:
    instructing, by the device, the particular node to capture packets of one or more specified traffic flows.

3. The method as in claim 2, further comprising:
    detecting, by the device, an anomaly using the machine learning-based anomaly detector; and, in response,
    requesting, by the device, captured packets associated with the detected anomaly from the particular node.

4. The method as in claim 1, further comprising:
    identifying, by the device, a set of the one or more nodes that convey intra-branch traffic in the branch network; and
    providing, by the device, the set of nodes that convey intra-branch traffic to a supervisory device.

5. The method as in claim 4, further comprising:
    receiving, at the device, a selection from the supervisory device of one of the set of nodes that conveys intra-branch traffic; and
    instructing, by the device, the selected node that conveys intra-branch traffic to capture traffic data regarding at least a portion of the intra-branch traffic for assessment by the anomaly detector.

6. The method as in claim 5, wherein instructing the selected node that conveys intra-branch traffic to capture traffic data regarding at least a portion of the intra-branch traffic comprises:
    instructing, by the device, the selected node to capture traffic associated with a particular host in the branch network.

7. An apparatus, comprising:
    one or more network interfaces to communicate with a network and a branch network;
    a processor coupled to the network interfaces and configured to execute one or more processes; and
    a memory configured to store a process executable by the processor, the process when executed operable to:
        perform anomaly detection functions using a machine learning-based anomaly detector to detect anomalous traffic in the network, wherein the apparatus is an edge switch or an edge router that connects one or more host devices and one or more intermediate devices in a branch network to the network;
        identify an ability of one or more nodes in the branch network to perform at least one of the anomaly detection functions, wherein the one or more nodes are the one or more host devices or the one or more intermediate devices in the branch network;
        dynamically select a particular one of the anomaly detection functions to offload to a particular node of the one or more nodes, based on the ability of the particular node to perform the particular anomaly detection function, wherein the particular node comprises a switch or router in the branch network; and
        based on the dynamic selection, offload the selected anomaly detection function from the apparatus to the particular node by instructing the particular node to perform the selected anomaly detection function, wherein offloading includes:
            instructing one or more of the nodes to forward traffic data to the particular node, and
            instructing the particular node to compute at least a portion of an anomaly detection model for the anomaly detector using the forwarded traffic data;
        train the anomaly detection model; and
        provide parameters of the trained anomaly detection model to the particular node to compute at least a portion of the model by updating the model.

8. The apparatus as in claim 7, wherein the selected anomaly detection function comprises capturing packets for inspection, and wherein the apparatus instructs the particular node to perform the selected anomaly detection function by:
    instructing the particular node to capture packets of one or more specified traffic flows.

9. The apparatus as in claim 8, wherein the process when executed is further operable to:
    detect an anomaly using the machine learning-based anomaly detector; and, in response,
    request captured packets associated with the detected anomaly from the particular node.

10. The apparatus as in claim 7, wherein the process when executed is further operable to:
  identify a set of the one or more nodes that convey intra-branch traffic in the branch network; and
  provide the set of nodes that convey intra-branch traffic to a supervisory device.

11. The apparatus as in claim 10, wherein the process when executed is further operable to:
  receive a selection from the supervisory device of one of the set of nodes that conveys intra-branch traffic; and
  instruct the selected node that conveys intra-branch traffic to capture traffic data regarding at least a portion of the intra-branch traffic for assessment by the anomaly detector.

12. The apparatus as in claim 11, wherein the apparatus instructs the selected node that conveys intra-branch traffic to capture traffic data regarding at least a portion of the intra-branch traffic by:
  instructing the selected node to capture traffic associated with a particular host in the branch network.

13. A method comprising:
  identifying, by a device in a network, a set of one or more nodes in a branch network connected to the network that convey intra-branch traffic, wherein the device is an edge switch or an edge router that connects the set of one or more nodes to the network;
  providing, by the device, the set of nodes that convey intra-branch traffic to a supervisory device;
  receiving, at the device, a selection from the supervisory device of one of the set of nodes that conveys intra-branch traffic, wherein the supervisory device dynamically selects a node that conveys intra-branch traffic based on an ability of the selected node to perform a particular anomaly detection function, wherein the node is a switch or router in the branch network;
  instructing, by the device, the selected node that conveys intra-branch traffic instead of the device to capture traffic data regarding at least a portion of the intra-branch traffic for assessment by a machine learning-based anomaly detector, wherein instructing includes:
    instructing the selected node to capture traffic associated with a particular host in the branch network; and
  instructing, by the device, the selected node to compute at least a portion of an anomaly detection model for the anomaly detector using the captured traffic;
  training, by the device, the anomaly detection model; and
  providing, by the device, parameters of the trained anomaly detection model to the selected node to compute at least a portion of the model by updating the model.

* * * * *

UNITED STATES PATENT AND TRADEMARK OFFICE
CERTIFICATE OF CORRECTION

PATENT NO. : 10,757,121 B2
APPLICATION NO. : 15/212588
DATED : August 25, 2020
INVENTOR(S) : Sukrit Dasgupta et al.

Page 1 of 1

It is certified that error appears in the above-identified patent and that said Letters Patent is hereby corrected as shown below:

In the Specification

Column 13, Line 45, please amend as shown:
first through $i^{th}$ device). Devices 504 may be, for example, Signed and Sealed this
Fifteenth Day of December, 2020

Andrei Iancu
*Director of the United States Patent and Trademark Office*